(12) United States Patent
Kalyanam et al.

(10) Patent No.: US 11,620,274 B2
(45) Date of Patent: Apr. 4, 2023

(54) METHOD AND SYSTEM OF AUTOMATICALLY PREDICTING ANOMALIES IN ONLINE FORMS

(71) Applicant: INTUIT INC., Mountain View, CA (US)

(72) Inventors: Janani Kalyanam, San Diego, CA (US); Zhewen Fan, San Diego, CA (US); Byungkyu Kang, San Diego, CA (US); Kate Elizabeth Swift-Spong, San Diego, CA (US); Shivakumara Narayanaswamy, Mountain View, CA (US); Farzaneh Khoshnevisan, Raleigh, NC (US)

(73) Assignee: INTUIT INC., Mountain View, CA (US)

( * ) Notice: Subject to any disclaimer, the term of this patent is extended or adjusted under 35 U.S.C. 154(b) by 158 days.

(21) Appl. No.: 17/245,741

(22) Filed: Apr. 30, 2021

(65) Prior Publication Data

US 2022/0350790 A1 Nov. 3, 2022

(51) Int. Cl.
*G06F 16/00* (2019.01)
*G06F 16/23* (2019.01)
*G06N 20/00* (2019.01)
*G06F 40/279* (2020.01)
*G06F 40/174* (2020.01)
*G06F 17/18* (2006.01)

(52) U.S. Cl.
CPC .......... *G06F 16/2365* (2019.01); *G06F 17/18* (2013.01); *G06F 40/174* (2020.01); *G06F 40/279* (2020.01); *G06N 20/00* (2019.01)

(58) Field of Classification Search
CPC .... G06F 16/2365; G06F 17/18; G06F 40/174; G06F 40/279; G06N 20/00
See application file for complete search history.

(56) References Cited

U.S. PATENT DOCUMENTS

| 11,277,437 | B1* | 3/2022 | Burgis | G06Q 20/4016 |
| 2002/0156846 | A1* | 10/2002 | Rawat | G06F 40/174 |
| | | | | 715/744 |
| 2002/0171435 | A1* | 11/2002 | Tsuboi | G01D 5/2046 |
| | | | | 324/547 |
| 2003/0105760 | A1* | 6/2003 | Sini | G06F 40/174 |
| 2005/0216356 | A1* | 9/2005 | Pearce | G06F 16/958 |
| | | | | 707/E17.116 |
| 2017/0199857 | A1* | 7/2017 | Greiner | G06F 40/174 |

(Continued)

*Primary Examiner* — Noosha Arjomandi
(74) *Attorney, Agent, or Firm* — DLA Piper LLP (US)

(57) ABSTRACT

A computer-implemented system and method for predicting and flagging an anomaly entered in a digital form. A server computing device classifies a plurality of data fields of the digital form to identify a set of non-zero value data fields; and obtains an anomaly detection model comprising a statistical tree structure associated with the data field of the digital form. The server computing device receives datasets including a target value of a data field and values of a set of cohorting data features; traverses a statistical tree structure of the anomaly detection model with the target dataset to form a set of target cohorts to determine a target statistic value for the data field; flags the data field value of the target dataset as an anomaly item; and generates one or more confidence scores for a runtime prediction based on one or more variance changes for the data field.

20 Claims, 19 Drawing Sheets

(56) References Cited

U.S. PATENT DOCUMENTS

| | | | |
|---|---|---|---|
| 2017/0220540 A1* | 8/2017 | Wang | G06F 40/174 |
| 2017/0287178 A1* | 10/2017 | Mankovskii | G06T 11/206 |
| 2018/0322004 A1* | 11/2018 | Jain | G06F 11/3476 |
| 2020/0136923 A1* | 4/2020 | Altshuler | G06F 16/288 |
| 2021/0117614 A1* | 4/2021 | Lamaute | G06F 40/174 |
| 2021/0208995 A1* | 7/2021 | de Abreu Pinho | G06N 5/045 |
| 2021/0377737 A1* | 12/2021 | Zaffino | H04W 12/121 |
| 2022/0114593 A1* | 4/2022 | Johnson | G06K 9/6256 |
| 2022/0198264 A1* | 6/2022 | Guo | G06N 3/08 |

\* cited by examiner

| line_item | significance |
|---|---|
| amount_salaries_and_wages | 0.423 |
| amount_deductible_self_employment_tax | 0.3901 |
| SCHC_B | 0.1267 |
| SCHC_total_gross_receipts | 0.0211 |
| amount_total_deductions | -0.0094 |

Anomaly detection analysis

Flagged item

FIG. 10C

METHOD AND SYSTEM OF AUTOMATICALLY PREDICTING ANOMALIES IN ONLINE FORMS

CROSS-REFERENCE TO RELATED APPLICATION

This application is related to U.S. application Ser. No. 16/745,604, filed Jan. 17, 2020, entitled COMPUTER ESTIMATIONS BASED ON STATISTICAL TREE STRUCTURES, which is incorporated herein by reference.

BACKGROUND

Evaluating data fields (e.g., line items) of online forms is an important part of form filling processes to ensure data quality and consistency of form entries. The form filing evaluation requires data accuracy, quality and consistency to produce correct results through online form processing applications and platforms. In the tax preparation process, for example, a large number of online form-filled returns still require manual evaluation before filing the tax returns. A high percentage of the online filled forms have at least one error and need to be returned to corresponding filing entities for correction, which is undesirable. Thus, there is a need to detect anomalous data fields in digital forms to predict high risk form filing documents (e.g., tax returns) and make corresponding corrections promptly while improving accuracy, efficiency, and productivity of the evaluation processes.

BRIEF DESCRIPTION OF THE FIGURES

The foregoing and other aspects of embodiments are described in further detail with reference to the accompanying drawings, in which the same elements in different figures are referred to by common reference numerals. The embodiments are illustrated by way of example and should not be construed to limit the present disclosure.

FIG. 10C shows example predicted anomalous data fields in accordance with some embodiments of the present disclosure.

DETAILED DESCRIPTION

Embodiments of the present disclosure provide machine learning techniques for predicting and flagging anomalous data fields or line items associated with a digital form in a real-time intelligent system.

The disclosed principles provide a machine learning based anomaly detection system executed by a processor or a computing device to predict and flag anomalous items in online forms during online form filling evaluation processes. In one or more embodiments, the anomaly detection system determines confidence scores of the flagged anomalous items and provides additional explanation regarding the flagged anomalous items.

In one or more embodiments, the disclosed anomaly detection system includes anomaly detection models with statistical tree structures trained for a plurality of data fields of online digital forms. The statistical tree structures are executed to organize users into multiple cohorts with respect to a data field according to values of a plurality of data features. Statistics are determined for a data field corresponding to each cohort at a respective node of a trained statistical tree structure for the data field. When the statistic is not within a range of e.g., a pair of thresholds found in a leaf node cohort according to a probability distribution, the value of the target data may be flagged to signal an error value or an anomalous data field in the online form.

In one or more embodiments, error values, confidence scores and anomalous items are effectively and accurately predicted by applying the disclosed methods to user actual data features based on the predetermined statistics (e.g., probability distribution) of data fields. The disclosed anomaly detection system provides improvements on how to predict and flag anomalies through, among other things, a pair of thresholds that are dynamically set for each anomaly detection model to maximize the model accuracy and allow updating when retraining the anomaly detection models.

Figure 1:
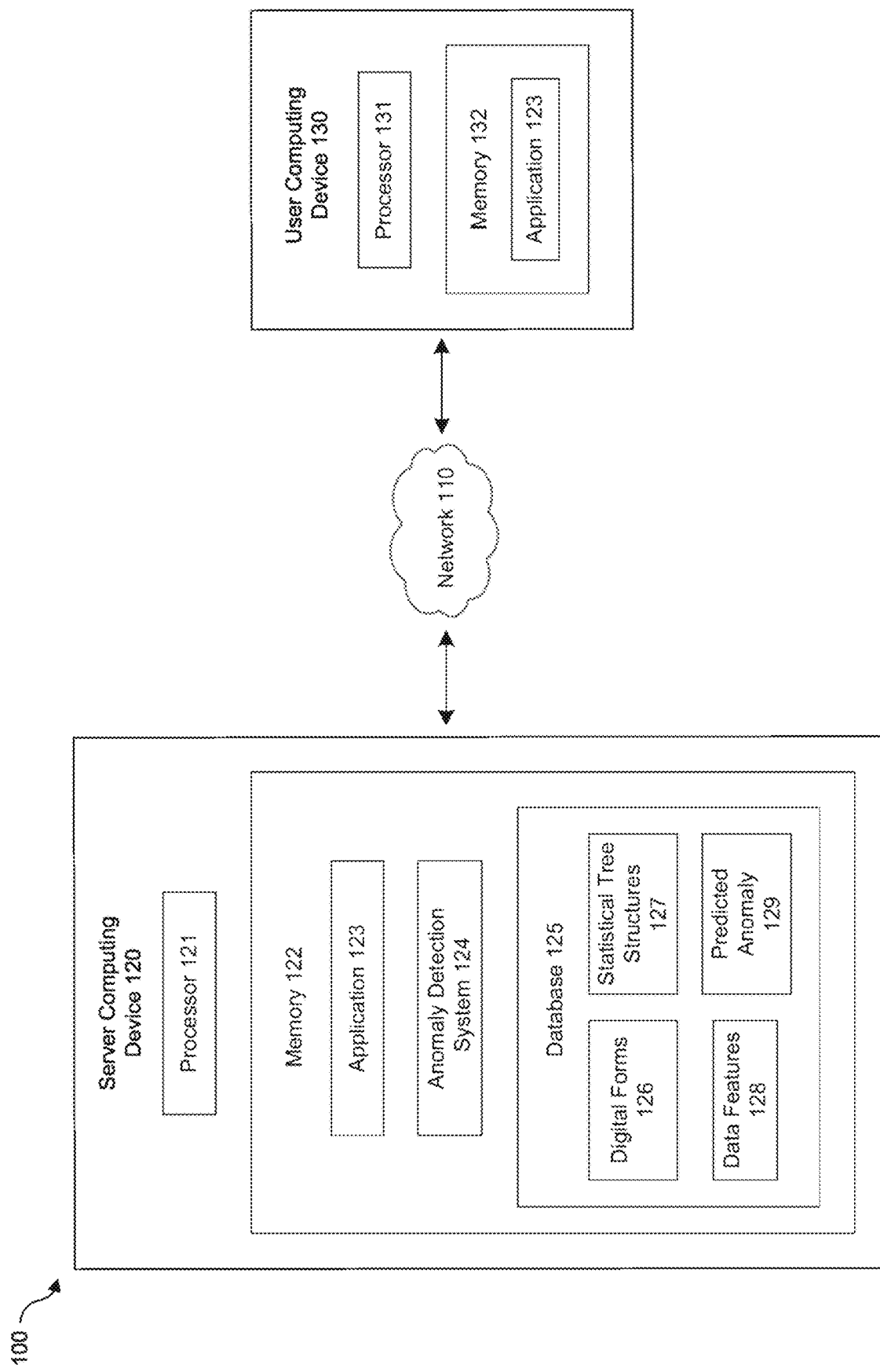
FIG. 1 illustrates an example computing system according to some embodiments of the present disclosure.

FIG. 1 illustrates an example computing system 100 for automatically predicting and flagging anomalous data fields in a digital form in accordance with the disclosed principles. The example computing system 100 includes a server computing device 120 at least one user computing device 130 that may be communicatively connected to one another in a cloud-based or hosted environment by a network 110. Server computing device 120 may include a processor 121, memory 122 and communication interface (not shown) for enabling communication over the network 110. The server computing device 120 may host one or more software services or products for digital form filing in the cloud-based or hosted environment. The one or more software services may be indicative of one or more applications 123 stored in memory 122. For example, the one or more applications 123 may provide one or more functionalities to support online form filling tasks (e.g., accounting tasks, tax calculation tasks, mortgage tasks, insurance tasks, multimedia applications, gaming, social network tasks, education system application, record keeping or other administrative tasks), or any other form filing related process or service. The one or more applications 123 are executed by the processor 121 for providing digital form filing processing services or providing one or more websites with corresponding services allowing users to submit digital forms. The one or more applications 123 may continuously receive and update data features 128 captured from software services or other data resources associated with user accounts and the software services via the network 110. The network 110 may include the Internet and/or other public or private networks or combinations thereof.

Memory 122 stores an anomaly detection system 124, including various operatable program modules or models, which are implemented by computer-executable instructions executed by the processor 121 for implementing methods, processes, systems and embodiments described in the present disclosure. Generally, computer-executable instructions include software programs, objects, models, components, data structures, and the like that perform functions or implement particular data types. The computer-executable instructions may be stored in a memory communicatively coupled to a processor and executed on the processor to perform one or more methods described herein.

A user computing device 130 includes a processor 131, memory 132, and an application browser 133. For example, a user device 130 may be a smartphone, personal computer, tablet, laptop computer, mobile device, or other device. Users may be registered customers of the one or more applications 123. Each user may create a user account with user information for subscribing and accessing a particular form filing related software service or product provided by the server computing device 120.

Database 125 may be a data store included in the server computing device 120 or coupled to or in communication with the processor 121 of the server computing device 120 via the network 110. Database 125 may store digital forms 126 with data fields or line items, statistical tree structures 127, data features 128 and predicted anomalies 129. Database 125 may store user account information associated with user data features corresponding to respective digital forms.

Digital forms 126 may be represented by fillable form data structures including data fields or questions that are configured and defined to be filled-in or answered with appropriate data features for completing corresponding application processes hosted by the server computing device 120. Digital forms typically include data fields requiring numerical or textual entries. Each digital form 126 may be a fillable form data structure that includes a plurality of data fields configured to be filled with data features by users.

Each data field or question may be a data entry field predefined with a certain data structure, data type, or any combination thereof. The data fields or questions may be logically connected and dependent on each other for fulfilling the corresponding computer-implemented form evaluation process. The digital forms 126 or digital form data structures are executed by the processor 121 to collect user data and information for completing online form filing events. Example fillable digital forms may be various type of tax preparation or return forms, such as for 1040 and various schedules (e.g., schedule C, D, E, etc.) The fillable digital forms may include, but are not limited to, tax returns, mortgage applications, insurance applications, college applications, and/or financial aid applications, to name a few.

The stored data features 128 or line items will be retrieved and processed by the processor 121 as input feature datasets per each individual model request. The data features 128 may be used as the input features for training the statistical tree structure models for different data fields of a digital form 126.

For example, an application 123 hosted by the server computing device 120 is executed to generate the digital forms 126 by presenting a list of related questions or form fields with a series of interview screens on a display of a user computing device 130. The user may enter the appropriate responses or answers in response to the corresponding form fields by interacting with the application 123. The user data may be collected from other digital resources associated with software services and user accounts. The application 123 is executed by the processor 121 to capture and store user inputs or user data features 128 associated with a plurality of user accounts in the database 125. Tens, hundreds or thousands of data features may be associated with the plurality of users. The data features 128 may be the line items present in multiple digital forms associated with the users. The user data features 128 may include any type of comprehensive feature or feature datasets corresponding to contextual and/or numerical data, such as numbers, natural language words, terms, phrases, sentences, or any combination thereof. In one or more embodiments, the application 123 hosted by the server computing device 120 is executed to automatically process digital forms 126 with user data profiles to generate corresponding filled forms including corresponding user data features indicative of answers or responses to the predefined form data fields in the form 126.

Database 125 stores statistical tree structures 127 executed by the processor 121 to be trained by processing user data features 128 associated with a plurality of users to identify one or more anomalous data fields or line items in the filled digital form associated with an individual account. Details of the processes related to the statistical tree structures 127 are provided below with respect to FIGS. 5A, 5B and 6.

Figure 2:
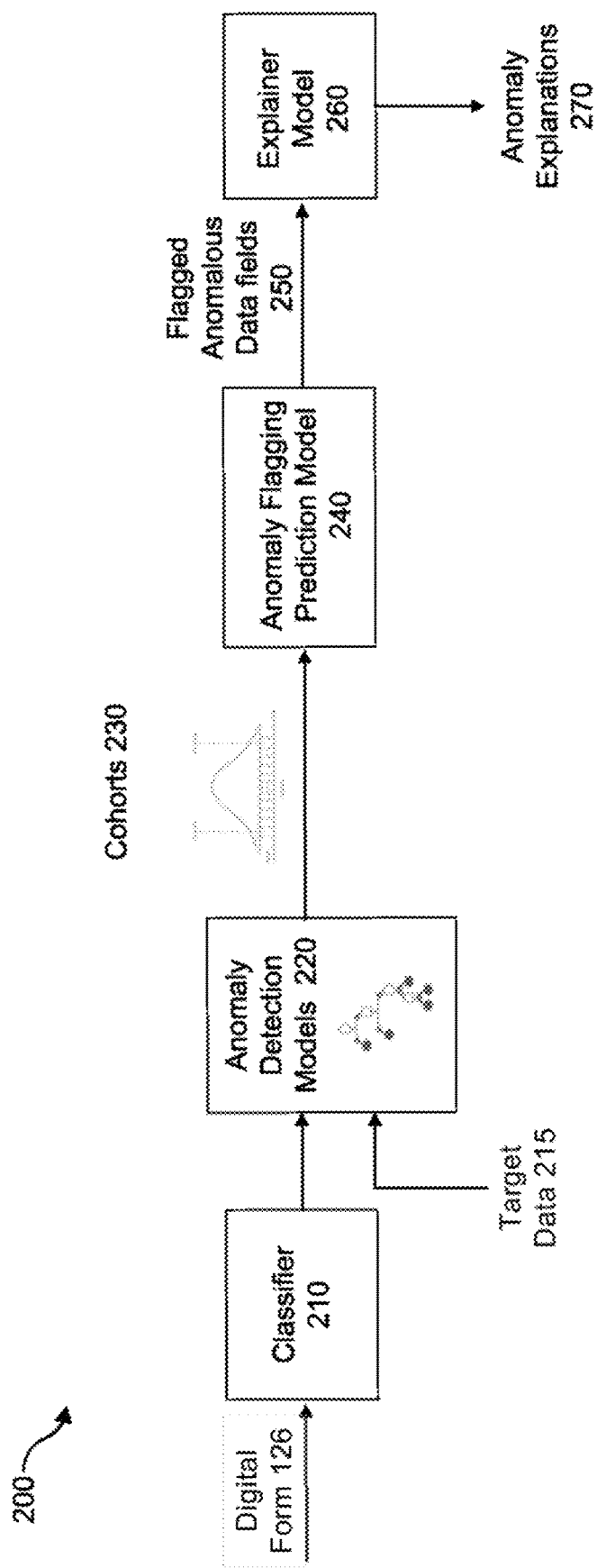
FIG. 2 illustrates a block diagram of an example machine learning based anomaly detection system for identifying and flagging anomalous data fields in accordance with some embodiments of the present disclosure.

FIG. 2 illustrates a block diagram of an example machine learning based anomaly detection system 200 for identifying and flagging anomalous line items associated with a digital form to improve form filing evaluation efficiency and accuracy in accordance with the disclosed principles. The example system 200 may be a semi-supervised anomaly prediction model system such as e.g., anomaly detection model system 124 (FIG. 1) or a personalized bagging model system configured to leverage machine learning to improve anomaly prediction accuracy by predicting and identifying anomalous line items during a digital form evaluation process. The anomaly prediction learning system 200 may be implemented as computer programs executed by the processor 121 of the server computing device 120. As illustrated in FIG. 2, the anomaly prediction learning system 200 includes various functional models, such as a classifier 210, a plurality of anomaly detection models 220, an anomaly flagging prediction model 240 and an explainer model 260. Statistical tree structures, which are part of the models 220, are executed to organize users into multiple cohorts 230 with respect to a data field. The organization is based on values of a plurality of cohorting data features (as described herein). Each anomaly detection model 220 is trained and generated based on the statistical values of corresponding data fields related to the digital forms 126. Statistics for a data field may correspond to each cohort at a respective node of a trained statistical tree structure for the data field. The anomaly flagging prediction model 240 may be executed to flag anomalous items (e.g. data fields) and determine confidence scores of the flagged anomalous items 250. The explainer model 260 is executed to provide additional explanation related to the flagged anomalous items.

Figure 3:
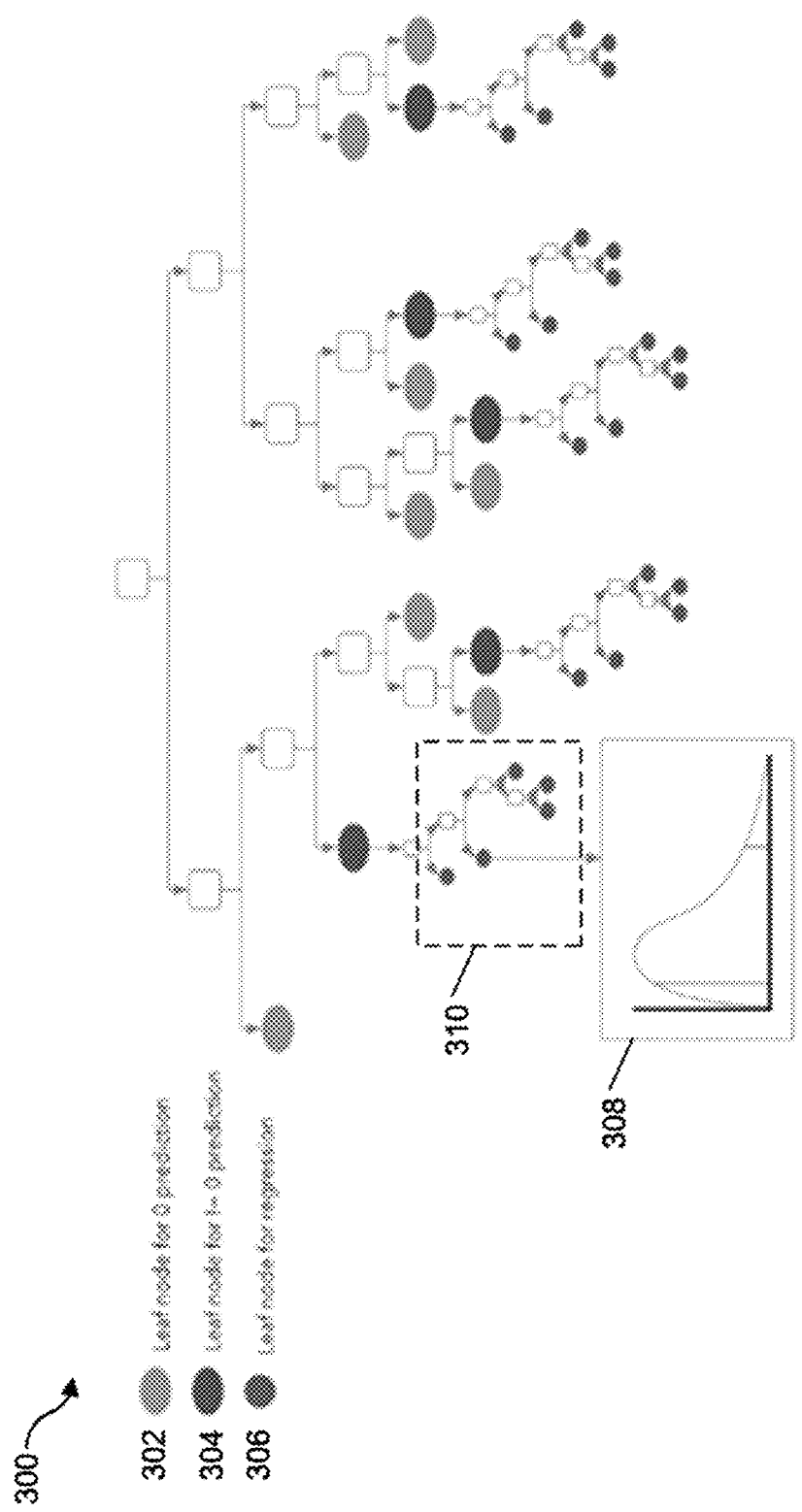
FIG. 3 illustrates a conceptual diagram of a machine learning based anomaly detection system in accordance with some embodiments of the present disclosure.

FIG. 3 illustrates a conceptual diagram 300 of a tree structure of a machine learning based anomaly detection system in accordance with the disclosed principles. The tree structure includes a plurality of nodes constructed to reflect two predicative functions classification and regression used in the anomaly prediction learning system 200.

Figure 4:
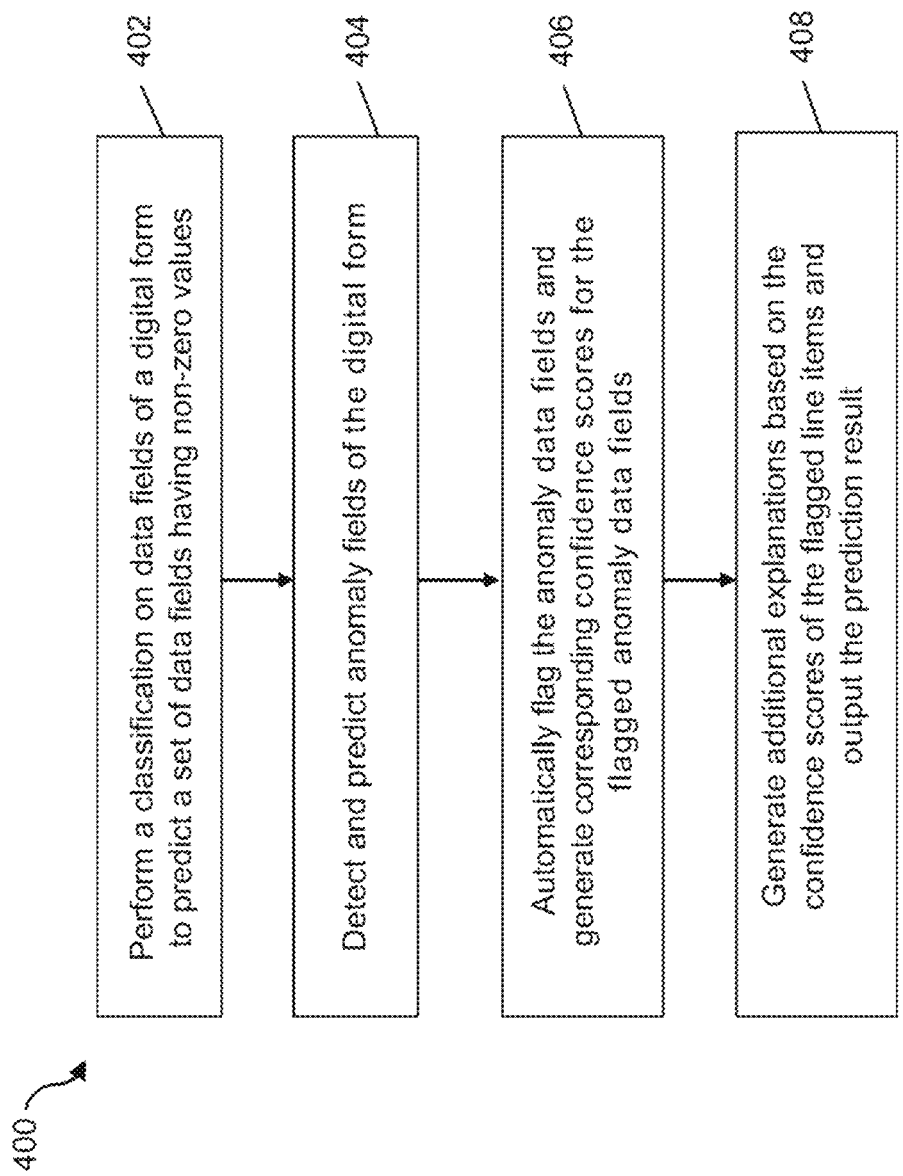
FIG. 4 is a flowchart illustrating an example process for processing data features to predict anomalous data fields in accordance with some embodiments disclosed herein.

FIG. 4 is a flowchart illustrating an example process 400 for processing data features to predict anomaly data fields corresponding to the anomaly detection system 200 and the conceptual diagram 300 in accordance with some embodiments disclosed herein.

In the illustrated example, classification represents a machine learning layer such as a classifier 210 on the top of the machine learning anomaly detection system 200. The digital form may include one or more zero data fields. As can be appreciated, there is no need to process the predefined zero data fields for predicting anomaly data fields in the digital form.

At block 402, the processor 121 executes the classifier 210 to perform classification operations on a plurality of fillable data items of a digital form stored in the database 125 to predict and detect whether a data item is defined to be a zero data field or a non-zero data field. The predicted zero data fields are represented by nodes 302. The predicted non-zero value data fields are represented by nodes 304. Each non-zero data field may be indicative of a data feature of a digital form. The classification process filters out the zero data fields in the digital form to avoid processing them and to help assure form filling evaluation accuracy. Only non-zero value data fields are used for regression processes in the anomaly detection models 220 to train the statistical tree structures to predict and flag anomalous data fields in the digital form.

At block 404, the processor 121 executes the anomaly detection models 220 to perform regression operations and to process the identified non-zero data fields with user data features 128 to detect and predict anomalous data fields or line items of the digital form. The anomaly detection models 220 may include multiple trained statistical tree structures 310 each being trained for a respective non-zero data field or a data feature of a digital form. Each anomaly detection model 220 may be a statistical machine learning model trained with a statistical tree data structure. An example statistical tree structure 310 may be constructed with a set of hierarchically organized nodes 306. A statistical tree structure 310 may be trained to build an anomaly detection model 220 for predicting whether the particular data field is an anomaly. Each user digital form includes values from a plurality of data fields. The user filled form is indicative of target data 215 that includes values of a plurality of data features. Each data feature may have a value for a respective data field. Details concerning the processes related to anomaly detection models and statistical tree structures will be described below with reference to FIGS. 5A-5C and 6.

At block 406, the processor 121 executes the trained anomaly detection models 220 and anomaly flagging prediction model 240 to process target data 215 to automatically predict and flag the anomalous data fields, and generate corresponding confidence scores for the flagged anomalous items 250. Details concerning the processing of target data 215 is described below with respect to FIG. 7.

At block 408, the processor 121 executes the explainer model 260 to process the flagged anomaly items 250 and generate additional anomaly explanations 270 to be presented e.g., on a computer display. Details concerning the processes related to the explainer model 260 are described below with respect to FIGS. 10A-10C.

Aspects of one example of a statistical tree structure are described in application Ser. No. 16/745,604, filed Jan. 17, 2020, entitled COMPUTER ESTIMATIONS BASED ON STATISTICAL TREE STRUCTURES, which is incorporated by reference herein.

Figure 5A:
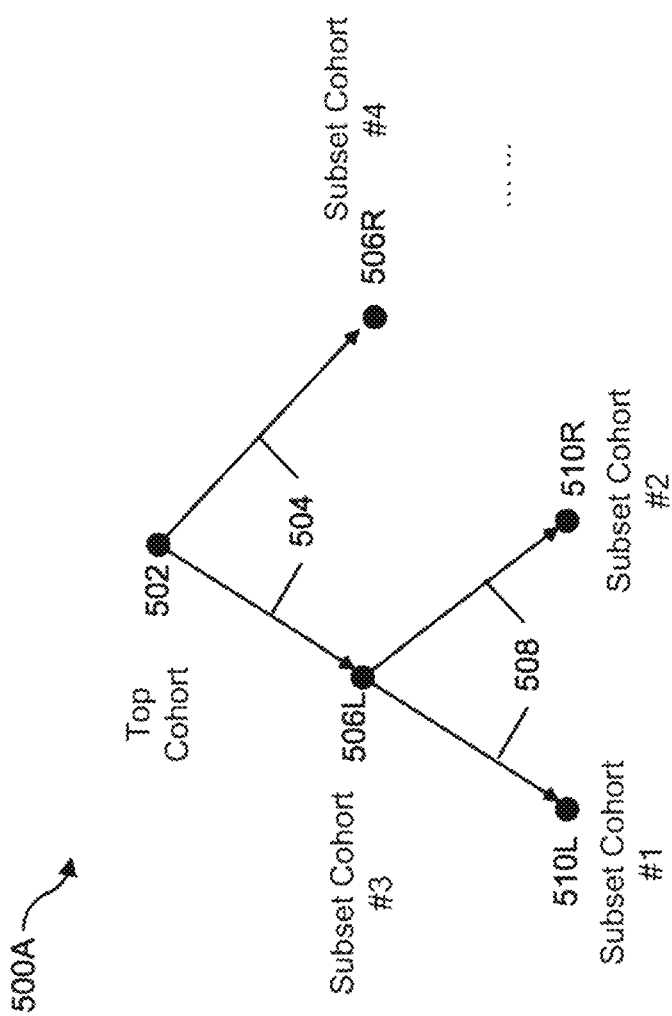
FIG. 5A illustrates a partial statistical tree structure in accordance with some embodiments disclosed herein.

FIG. 5A illustrates an example of a partial statistical tree structure 500A in accordance with some embodiments disclosed herein. The example statistical tree structure 500A includes a plurality of hierarchically organized nodes connected by two branches. For example, the statistical tree structure 500A includes a plurality of nodes such as a top node 502, intermediate nodes 506L, 506R, and leaf nodes 510L, 510R. The top node 502 is connect to the intermediate node 506L, 506R by branches 504 while the intermediate node 506L, 506R are connected to the leaf nodes 510L, 510R by branches 508. Each node represents a cohort or a group of users. Each user of a cohort may have a user digital form, which includes a set of data fields or data features with corresponding values of the data features. The example statistical tree structure 500A may be trained to evaluate a data field that is indicative of a training data feature (e.g., "amount_salaries"). The values of the set of the data features for each user may include a value of the training data feature for a particular data field and values of other data features indicative of respective cohorting data features. For each statistical tree structure, the training data feature is different from the cohorting data feature selected for determining the branches form a higher-level cohort or node to a lower-level cohort or node.

Figure 5B:
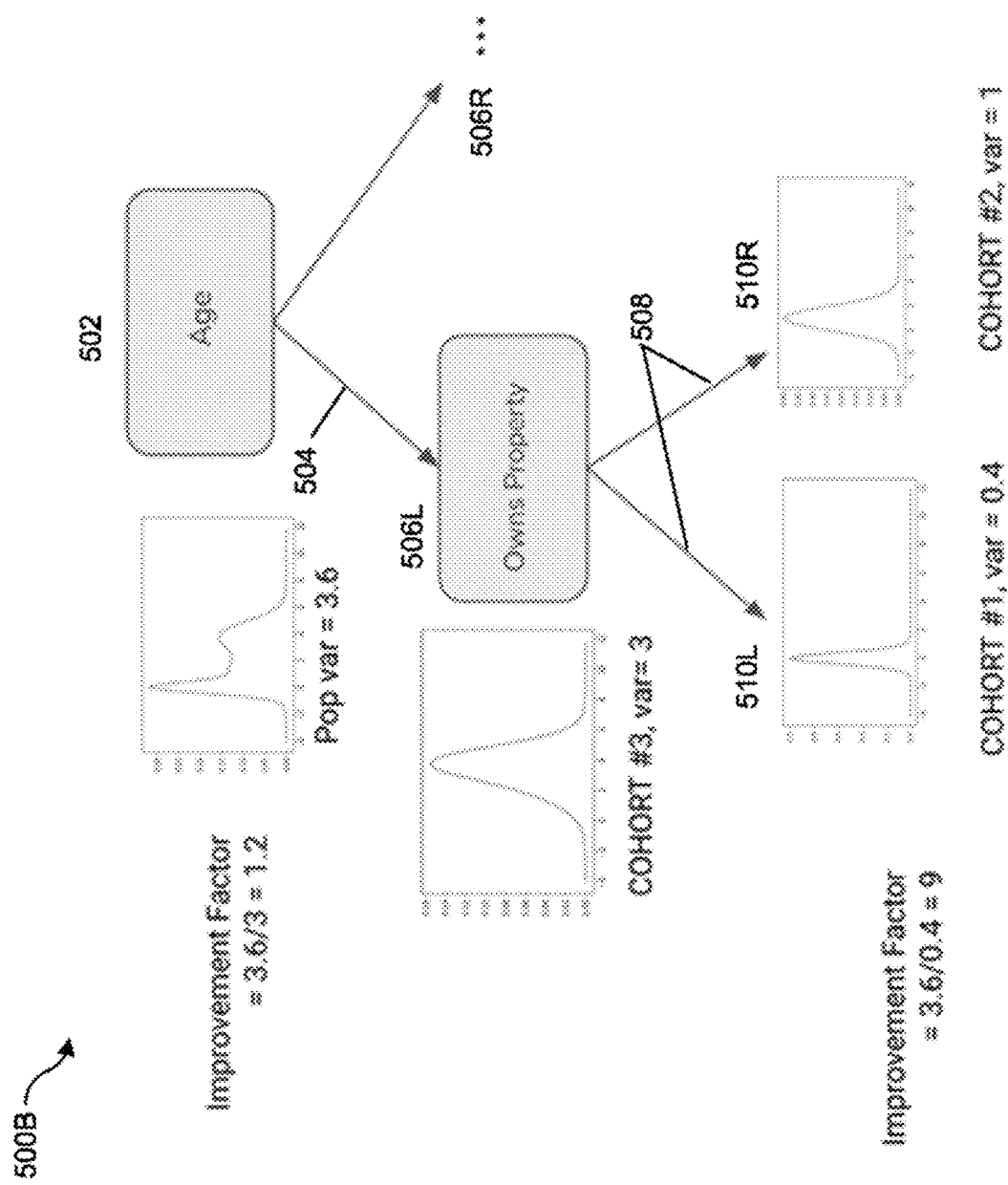
FIGS. 5B-5C illustrate example trained statistical tree structures in accordance with some embodiments disclosed herein.
Figure 5C:
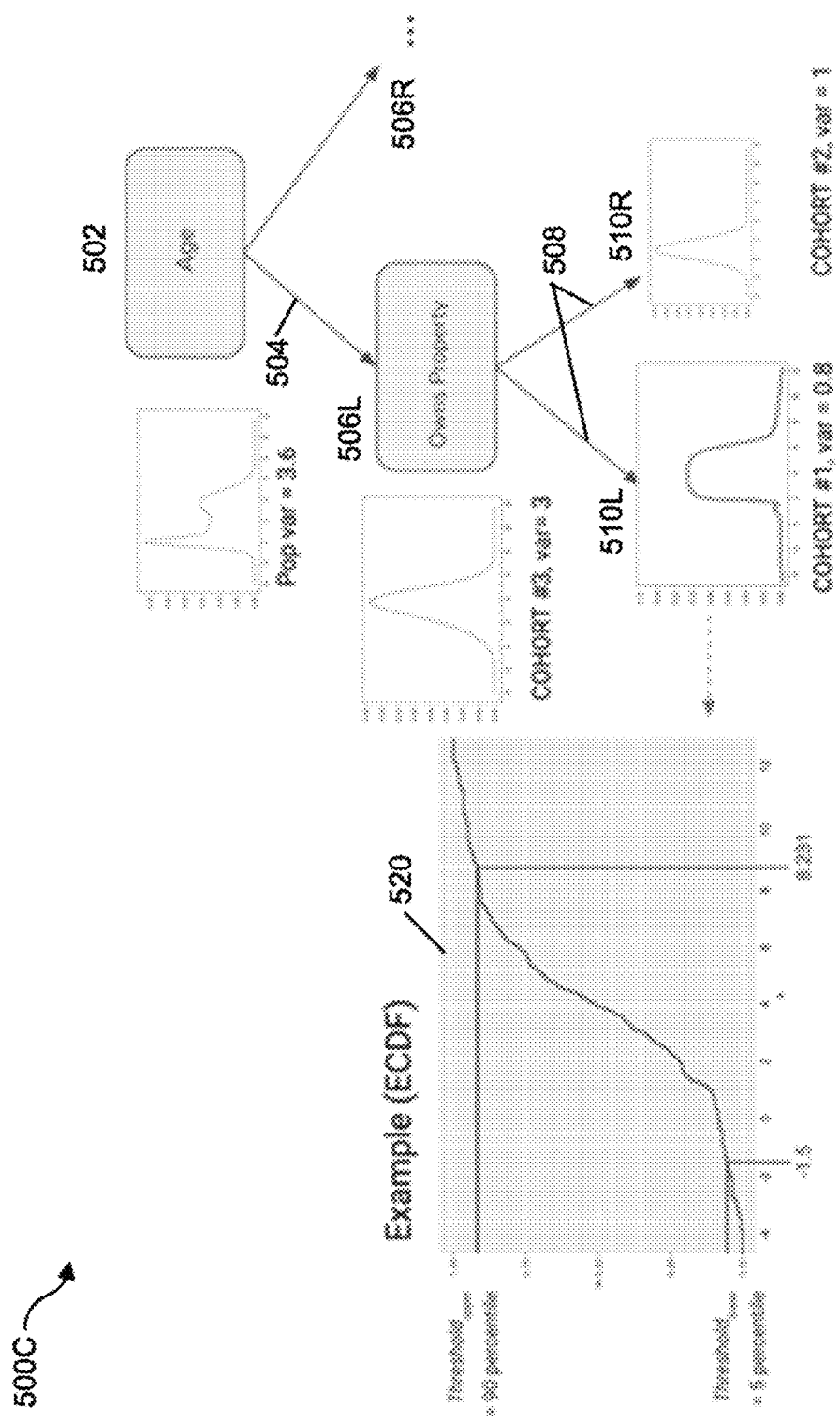

The statistical tree structure for the specific data field may be trained with values of the training data feature and values of cohorting data features stored in the database 125. FIGS. 5B-5C illustrate example trained statistical tree structures 500B and 500C corresponding to the partial statistical tree structure of 500A in accordance with some embodiments disclosed herein.

Figure 6:
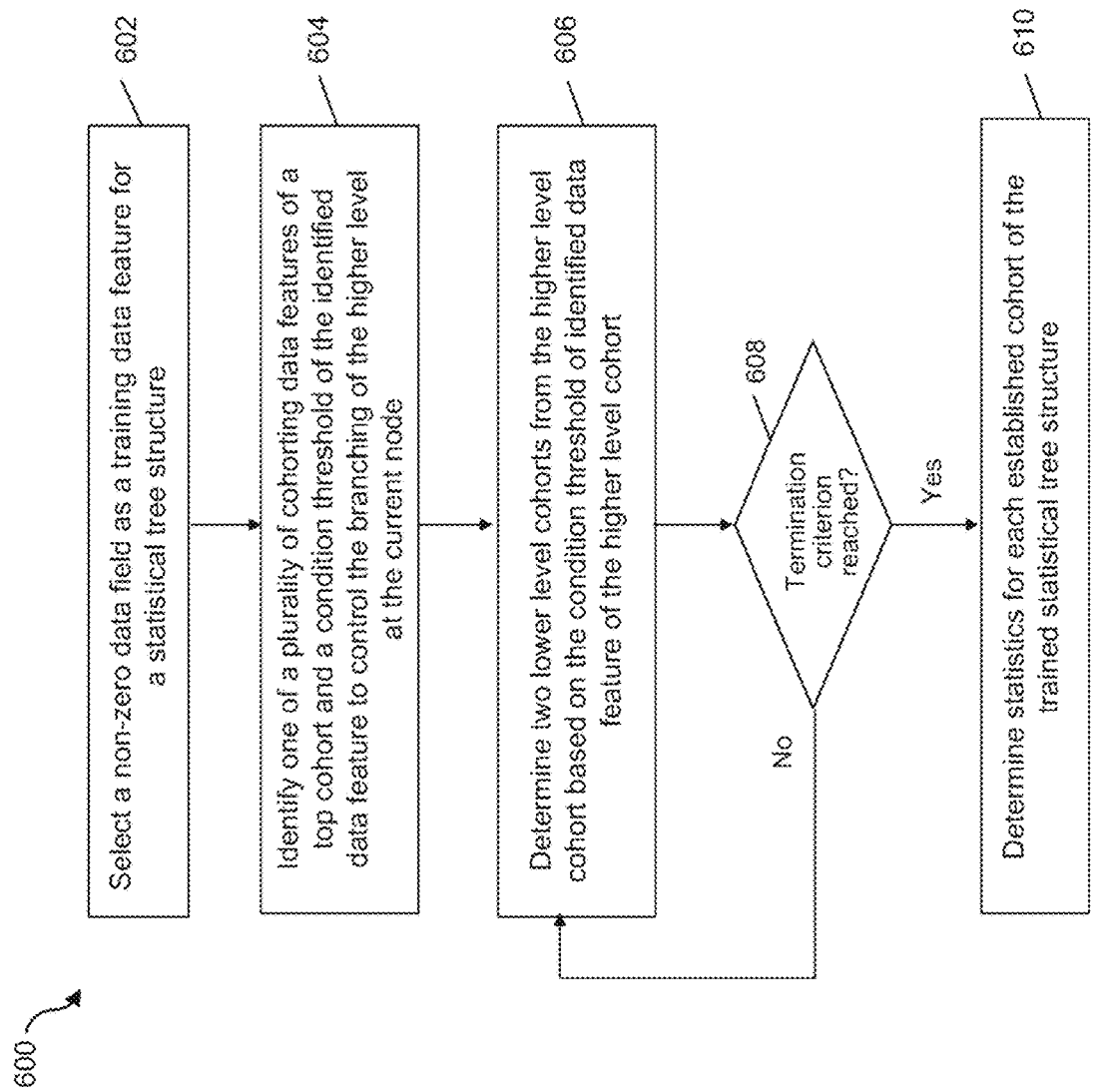
FIG. 6 is a flowchart illustrating an example process for generating an anomaly detection model for a data field in accordance with some embodiments disclosed herein.

FIG. 6 is a flowchart illustrating an example process 600 for generating an anomaly detection model 220 for a data field in accordance with some embodiments disclosed herein. A statistical tree structure may be trained to generate an anomaly detection model to enable a statistical analysis of a non-zero value data field of a digital form.

At block 602, the processor 121 selects a data field from the set of predicted non-zero data fields as a training data feature (e.g., "amount_salaries") to train a statistical tree structure for predicting whether the particular data field is an anomaly in a filled user digital form. Cohorting data features may include any data feature except the data feature selected as the training data feature for the data field. That is, the training data feature corresponding to the data field is different from the cohorting data feature selected to determine the branches form higher-level cohorts to lower-level cohorts at the current node. A statistical tree structure for a data field may be constructed by reducing or minimizing the variance in the values of the training data feature of respective cohorts from a high-level cohort or node to a low-level cohort or node.

Each cohort may include a set of data entries, such as a number of users in the cohort, a statistical value (e.g., variance) of the training data feature for the cohort at the current node, etc.

The variance may be the square of the population standard deviation and indicate how values of the training data feature X are spread out in the population of a cohort. It is the average of the distance from each value of the training data feature in the population of the cohort to the mean ($\mu$) and can be determined by equation (1):

$$\sigma^2 = \frac{\sum (X - \mu)^2}{N} \quad (1)$$

For example, a population variance (e.g., Pop var=3.6 at the top node 502 in FIG. 5B) of the training data feature may be determined by equation (1) based on values of the training data feature of a cohort.

At block 604, the processor 121 identifies and selects one of the cohorting data features of a top cohort and provides a binary function (e.g., true or false) to a condition threshold related to the selected data feature to control the binary branching of the top cohort at the first node to the two lower level cohorts. In one embodiment, the selected data feature related to the condition threshold may have the highest correlation with the training data feature and may be the best candidate for the binary branching to minimize the variance in the data values of the training data feature of the cohort below the binary branching. Referring to FIG. 5B, each user may have values of a plurality of cohorting data features such as "age," "owns property", etc. The data feature to determine branches of the subset cohorts may be related to the "age" or "owns property" data features. The "age" data feature and a condition threshold related to "age" may be found to reduce or minimize the variance in the data values of the training features of the cohort at the current node. For example, the condition threshold related to the "age" data feature may be 29.5 years to establish binary branching. Accordingly, "age" is selected to be used as the data feature to split the top cohort at the first node 502 into two branches 504 (FIG. 5A). Referring to FIGS. 5A and 5B, the true branch 504 may be formed from the first node 502 to the intermediate node 506L corresponding to a subset cohort #3 when the value of the "age" data feature is less than or equal to the threshold. A false branch may be formed from the first node 502 to the intermediate node 506R corresponding to a subset cohort #4 when the value of the "age" data feature is larger than the threshold. In this case, the variance in data values of the training data feature is reduced from a variance of 3.6 at the first node 502 (e.g., main cohort, Pop var=3.6) to a variance of 3 at the at the intermediate node 506L (e.g., cohort #3, var=3) when using the "age" data feature in comparison to other data features such as "owns property".

At block 606, the processor 121 determines two subset or lower level cohorts for the current cohort to the two branches from the current node based on the condition threshold to control the branching. In one or more embodiments, the statistical tree structure is trained to determine a first subset cohort for a first branch of the two subset branches, based on values of the cohorting data features of the first subset or lower level cohort meeting the condition threshold of the identified data feature. In one or more embodiments, the statistical tree structure is trained to determine a second subset or lower level cohort for a second branch of the two branches, based on the values of the data features of the second subset cohort not meeting the condition threshold. The condition threshold is selected to minimize and diminish a variance in the values of the training data feature of the first subset cohort and a variance in the values of the training data feature of the second subset cohort from the current cohort.

Block 606 may be repeatedly executed many times by iterating the branching into two branches for different combinations of data features and condition thresholds related to the data features until a minimum variance in values of the training data feature at the node below the top node is detected. Any combination of a possible data features and threshold values may be trained and tested. The data feature related to the condition threshold of the subset cohort is selected to continuously introduce two lower branches at the current node for reducing and/or minimizing a variance in the values of the training data feature of the subset cohort.

For example, the true branch 508 may be formed from the intermediate node 506L to the leaf node 510L corresponding to a subset cohort #1 when the value of the "owns property" data feature is less than or equal to a corresponding threshold defined for the "owns property" data feature. Accordingly, the variance (cohort #3, var=3) of values of the training data feature at the node 510L is reduced to the variance of 0.4 (cohort #1, var=0.4) in values of the training data feature at the leaf node 510L and to a variance of 1 (cohort #1, var=1) in values of the training data feature at the leaf node 510R. As additional splits are performed in a descending order, the subset cohorts are determined until the leaf nodes are reached.

At block 608, the processor 121 performs processing on the subset cohorts to determine whether a termination criterion is reached and to therefore stop further branching. In some embodiments, the termination criterion may be a minimum threshold of a value of a data feature of the cohort at the current node, such as a minimum number of the cohort required for the branching descending from the current node. Once that number of users drops below an initially specified minimum threshold, further branching may not be allowed. In some embodiments, the termination criterion may be implemented by specifying a desired number of branches and/or cohorts as a model parameter.

Referring to FIG. 5B, branches are determined from a first node 502 through intermediate node 506L to leaf nodes 510L and 510R among the top cohort and the subset cohorts to minimize and decrease the variance in the values for the training data features of respective cohorts along the branches. In one embodiment, a leaf node may be automatically identified when the variance of the values for the training data feature in a branch descending from a node reaches zero. The optimal choice of a data feature and a threshold for branching may be incrementally determined.

At block 610, the processor 121 calculates and determines statistics such as a respective probability distribution of values of the training data feature for the data field for each established cohort at a respective node of the trained statistical tree structure of 500B.

The probability distribution of the training data feature may be a listing or function that shows all of the possible values (or intervals) of the data value and how often they may occur for a cohort. A probability distribution is a statistical function that describes all of the possible values and likelihoods that a value for a data field or an item may take within a given range. The processor 121 determines the conditional probability distribution p(y|X) of the training data feature for the respective data field for each cohort at each established node of the statistical tree structure 500B, where y is the value of a given or input data feature for a data field. X may represent one of the data features at the corresponding node or a composite value that incorporates multiple data features of the anomaly detection model. The probability distribution may be used to generate a desired prediction of a training data feature for a data field of the digital form. The processor 121 may determine other factors including the distribution's mean (average), standard deviation, etc. In some embodiments, the statistics values of the given data feature for the data field for each established cohort may be determined by converting a respective probability density function to a corresponding empirical cumulative distribution function (ECDF). As illustrated in FIG. 5C, the result 520 determined by the empirical cumulative distribution function (ECDF) is used to derive the percentiles of different values of the given data feature for the data field. Deriving the percentiles from the result 520 of the ECDF diagram may be used to generate the upper and lower thresholds for values of the given data features for a data field at a leaf node 510L in a particular anomaly detection model.

With the execution of the process 600, statistic values of the probability distribution and corresponding distinct percentiles of a training data feature may be generated for each cohort at the respective node with a reduction of variance in values of the training data features from a first node to leaf nodes. In some embodiments, the processor 121 may calculate and determine the conditional probability and distinct percentiles ranging from 1% to 99% based on the probability distribution of the values of the training data feature for each respective cohort or node of the statistical tree structure.

The process 600 may be used to train different statistical tree structures for each input data feature for each respective data field in different digital forms to generate different anomaly detection models. For example, twenty-five anomaly detection models may be trained and built with respective statistical tree structures for twenty-five data fields in a digital form, such as Form 1040 used in a tax return. The processor 121 may apply different anomaly detection models to evaluate a filled form by performing a statistical analysis for corresponding non-zero data fields to predict and flag whether a data field in a filled form is anomaly.

Figure 7:
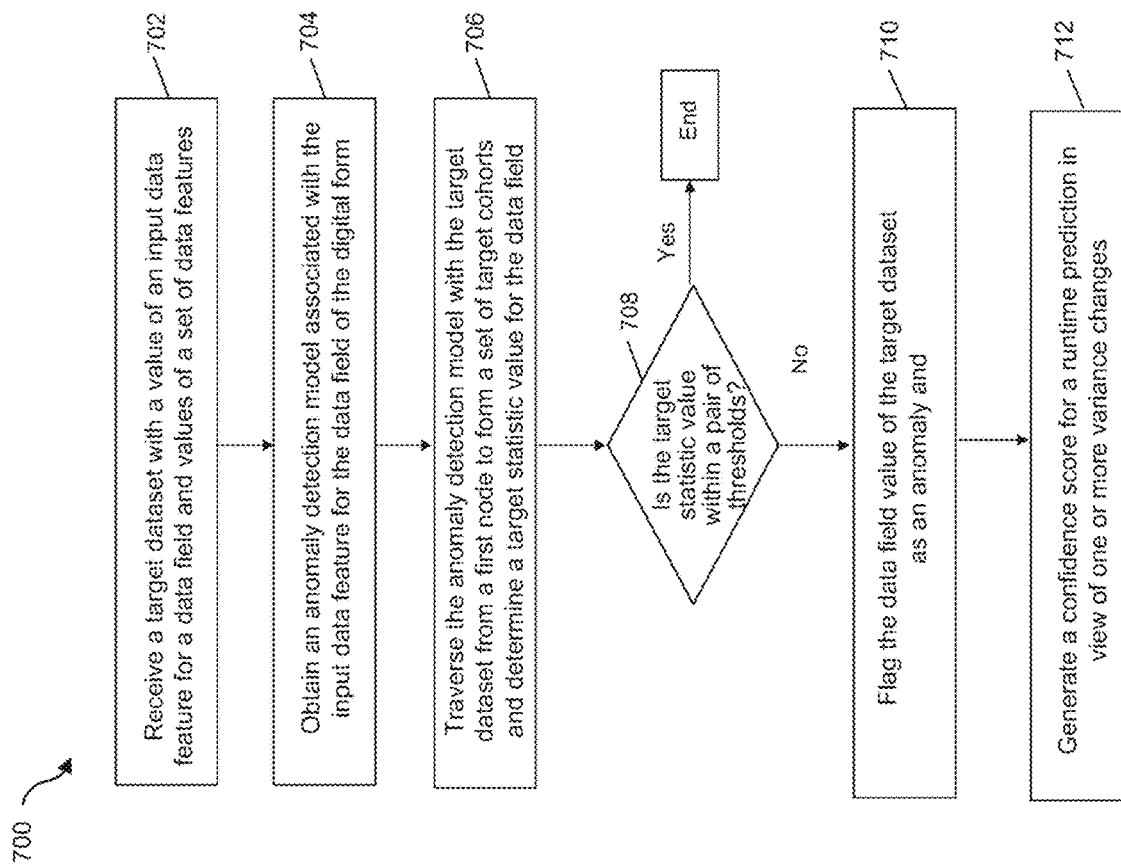
FIG. 7 is a flowchart illustrating an example process for predicting and flagging anomalous data fields with anomaly detection models in accordance with some embodiments disclosed herein.

FIG. 7 is a flowchart illustrating an example process for predicting and flagging anomaly data fields of a filled digital form with corresponding trained anomaly detection models 220 in accordance with some embodiments disclosed herein.

At block 702, the processor 121 receives a target dataset 215 associated with a digital form from the database 125. The target data 215 includes a target value of an input data feature for a data field and values of a set of cohorting data features. The input data feature is different from the cohorting data features.

At block 704, the processor 121 obtains one of a plurality of anomaly detection models for the input data feature from the database 125. Each anomaly detection model includes a trained statistical tree structure with a plurality of nodes. The plurality of nodes may correspond to a set of hierarchical cohorts starting from a top cohort at a first node. Each cohort may have a predetermined statistic or a set of statistic values of the data field or the input data feature, a variance in values of input data feature of the cohort and a plurality of cohorting data features.

At block 706, the processor 121 applies an anomaly detection model 220 to traverse the statistical tree structure with the target dataset 215 to determine a set of target cohorts from a first node towards a target leaf node. The traversing may include matching values of the cohorting data features of the target data to satisfy the condition thresholds associated with the respective data features of the respective nodes from a first node to a target leaf node along the set of the target cohorts. For example, as shown in the FIG. 5B, the set of target cohorts may be illustrated as the top cohort at the first node 502, the cohort #3 at an intermediate node 506L, and the cohort #1 at the target leaf node 510L. The target cohort #1 at the target leaf node 510L corresponds to a distinct predetermined probability distribution with corresponding distinct percentiles determined by the probability distribution. Referring to FIG. 5C, the result 520 generated by the empirical cumulative distribution function (ECDF) represents the predetermined probability distribution of the input data feature of cohort #1 at the leaf node 510L. The processor 121 determines a target statistic value for the target value of the data field or input data feature corresponding to target cohort #1 at the leaf node 510L.

At block 708, the processor 121 determines whether the target statistic value is within a pair of thresholds. As illustrated in FIG. 5C, the upper and lower thresholds may be determined by deriving percentiles for values of the input data features of cohort #1 at the leaf node 510L in the anomaly detection model for the data field. For example, a pair of thresholds may be two statistic values of 5th percentile for the lower threshold$_{lower}$ (e.g., a lower cut-off value $C_{low}$)) and $90^{th}$ percentile for the upper threshold$_{upper}$ (e.g., a higher cut-off value $C_{high}$)). The processor 121 determines whether the input data feature for the data field has a target statistic value below the 5th percentile or above the 90th percentile based on the result 520 of the predetermined probability distribution for the input data feature associated with the target cohort.

At block 710, upon determining that the target statistic value is not within the pair of thresholds, the processor 121 predicts and flags the target value for the data field as an anomalous value.

At block 712, in response to determining that the target value of the input data feature for the data field is an anomaly, the processor 121 applies an anomaly flagging prediction model including various prediction algorithms to generate confidence scores for a runtime prediction to further measure reliability of the prediction of the anomalous flag. In some embodiments, the processor 121 flags the data field of the target dataset as an anomalous data field or an outlier based on the confidence score with a binary dataset to indicate that the data field has an anomalous item or value. Each data field may be encoded with a binary dataset to indicate whether the data field has an anomalous value.

The process 700 may repeatedly apply respective statistical tree structures trained for a specific data field to predict whether each input data feature for the respective data field of a user digital form is an anomaly or not.

Figure 8A:
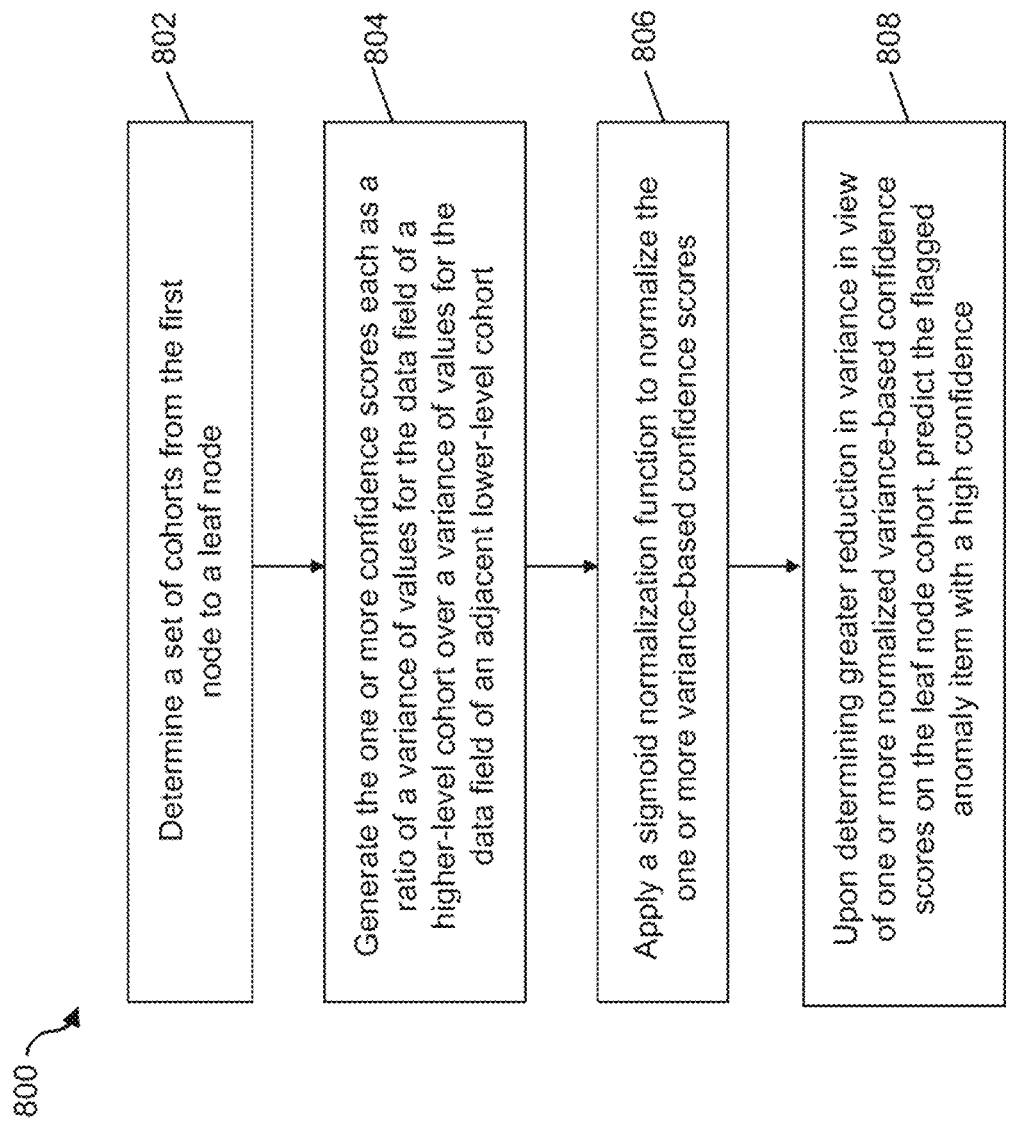
FIG. 8A is a flowchart illustrating an example process for generating a variance-based confidence score of a flagged anomalous item in accordance with some embodiments disclosed herein.

FIG. 8A is a flowchart illustrating an example process 800 for generating a variance-based confidence score of a flagged anomalous data field in accordance with some embodiments disclosed herein. The process 800 may be configured as a part of anomaly flagging prediction model 240 including computer programs (e.g., software) executed on one or more computers or servers including server computing device 120, in which the models, processes, and embodiments described below can be implemented. The process 800 may be used to generate a set of variance-based confidence scores based on reduced variance values associated with a set of cohorts related to the target dataset.

At block 802, the processor 121 traverses the statistical tree structure with the target dataset 215 to determine a set of target cohorts from the top node to a target leaf node and to obtain a set of variance values of the input data feature for the data field for the set of target cohorts as illustrated in FIG. 5B and block 706.

At block 804, the processor 121 determines a set of variance-based confidence scores as the ratio of a variance of values of the input data feature in the higher-level cohort over a variance of values of the input data feature of an adjacent lower-level cohort. For example, as illustrated in FIG. 5B, the ratio may be determined as an improvement factor of 1.2 at the intermediate node 506L and an improvement factor of 9 at the leaf node 510L.

At block 806, the processor 121 applies sigmoid normalization to normalize the one or more variance-based confidence scores to a range between 0 and 1. The sigmoid function includes a weight ($\alpha$) and a bias ($\lambda$). The weight may be adjusted for an improvement factor to calculate a weighted and normalized confidence score based on equation (2):

$$S(x) = \frac{1}{1 + e^{(-\alpha x + \lambda)}} \quad (2)$$

Through the two parameters, $\alpha$ and $\lambda$, each anomaly detection model for a data field may be further optimized. These two parameters may be configured to be adjusted and optimized to minimize a prediction error associated with each anomaly detection model.

Figure 8B:
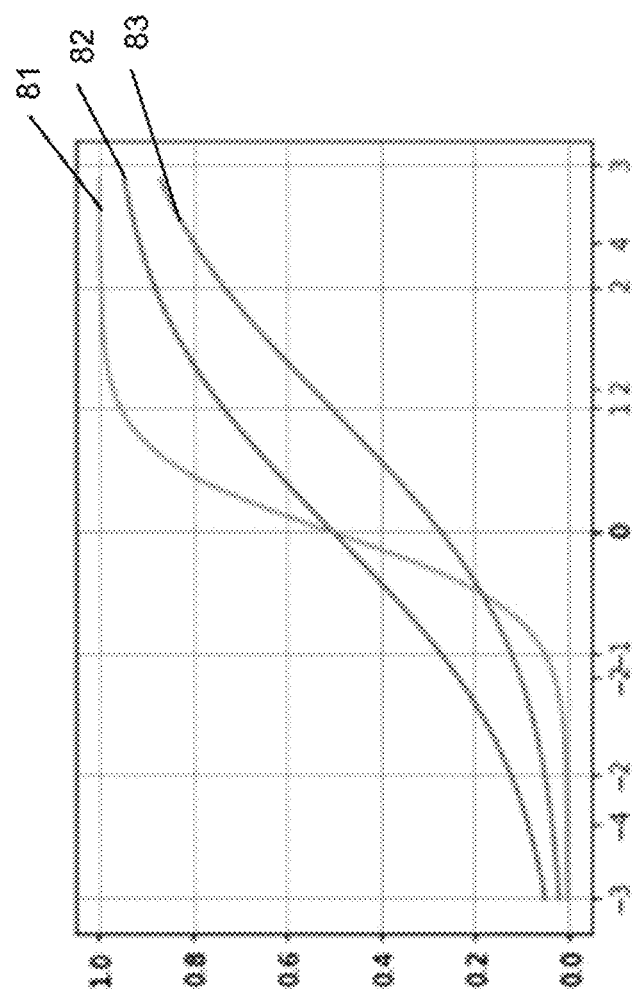
FIGS. 8B-8C show example diagrams related to sigmoid normalization in accordance with some embodiments disclosed herein.
Figure 8C:
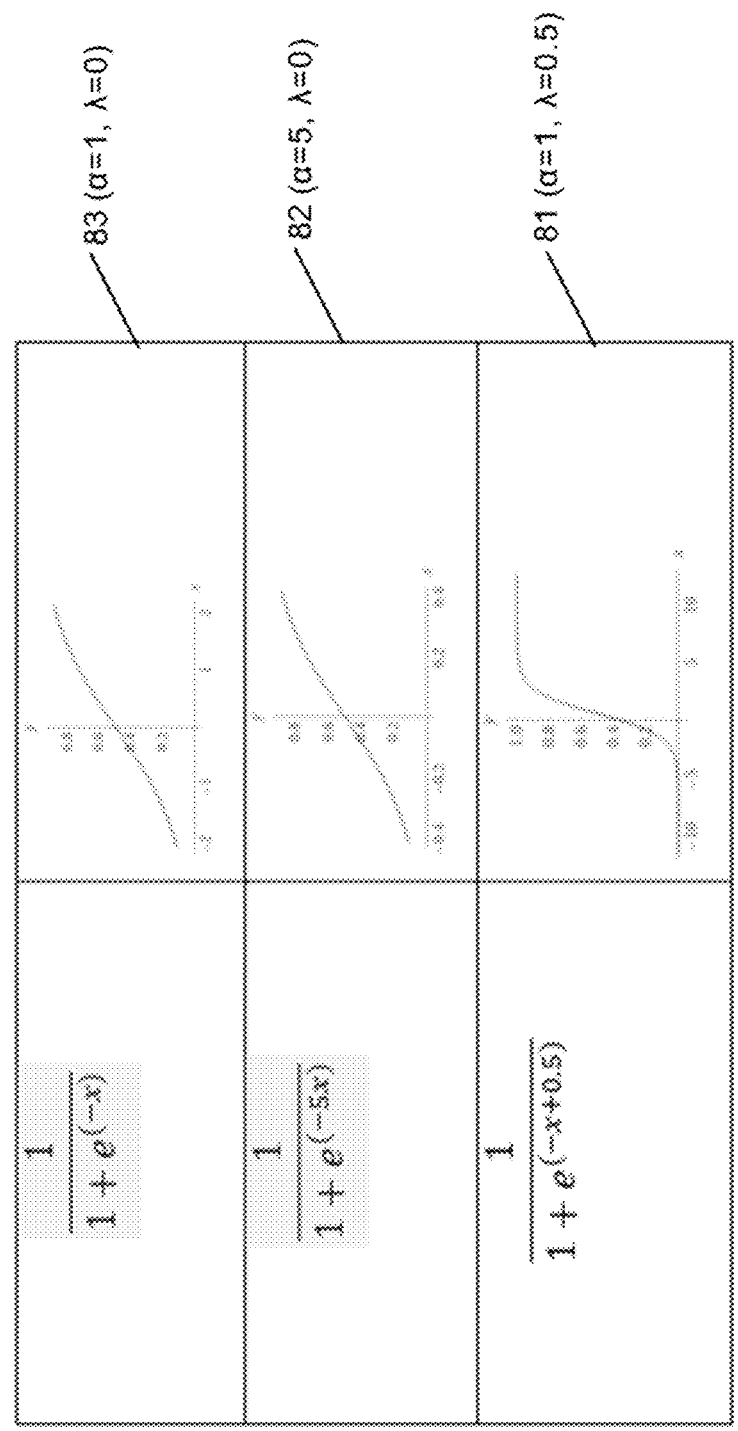

FIGS. 8B-8C shows example diagrams related to sigmoid normalization corresponding to different combinations of values of the two parameters, $\alpha$ and $\lambda$ of equation (2). As illustrated in FIGS. 8B-8C, the example outputs 81, 82 and 83 of the sigmoid function normalization demonstrate how the sigmoid function responses to a given input value varies with three different $\alpha$ and $\lambda$ values, where $\alpha$ is used to vary the sensitivity or slope of the response, and $\lambda$ applies bias by shifting the response behavior towards one or the other direction.

At block 808, upon determining greater reduction in variance in view of one or more normalized variance-based confidence scores on the leaf node cohort compared to one or more other higher-level cohorts, the processor 121 predicts and reports the flagged anomaly item with a high confidence.

Figure 9A:
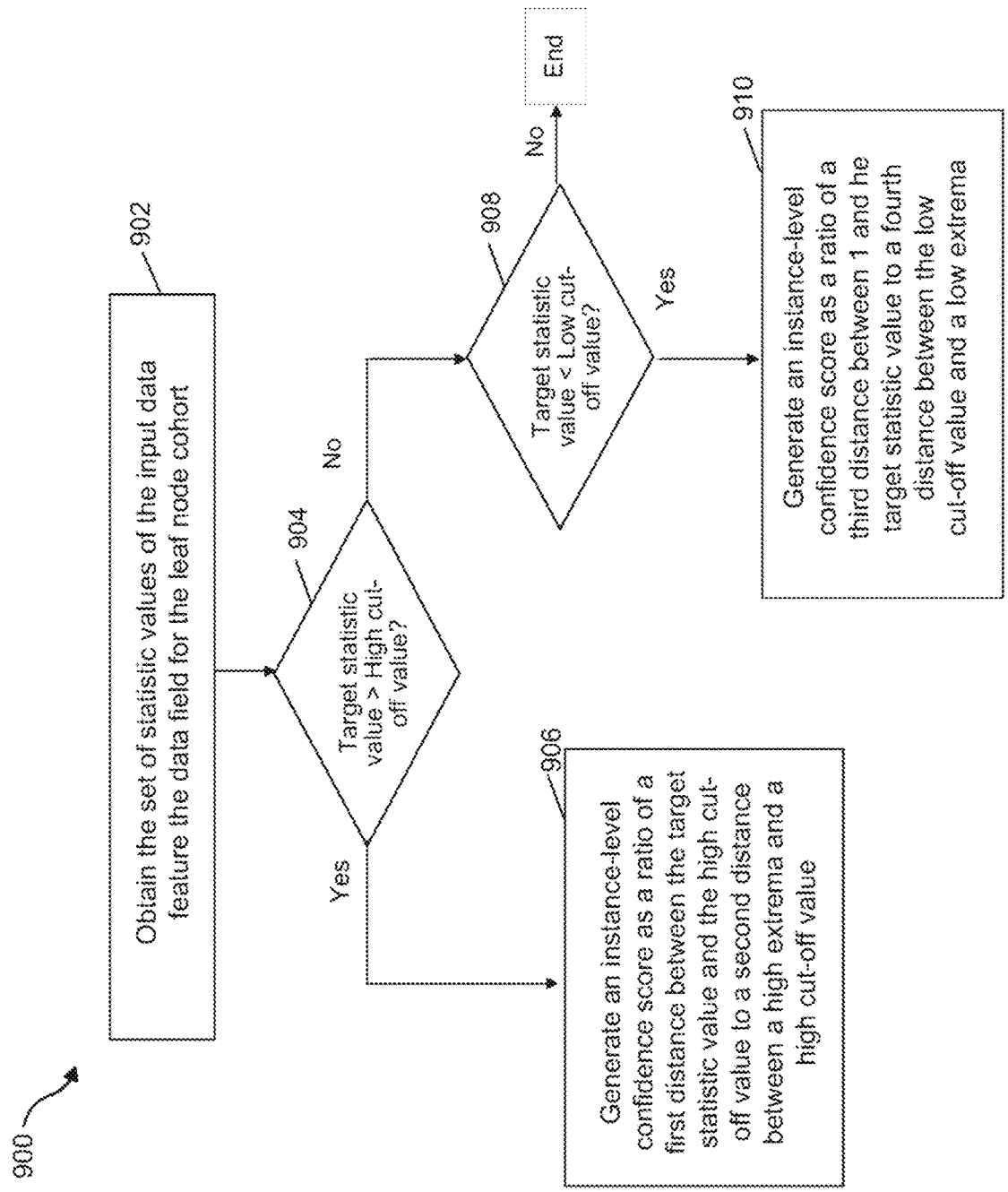
FIG. 9A is a flowchart illustrating an example process for generating one or more distance-based confidence scores of the flagged anomalous item in accordance with some embodiments disclosed herein.

FIG. 9A is a flowchart illustrating an example process 900 for generating one or more distance-based confidence scores of the flagged anomalous line item or data field in accordance with some embodiments disclosed herein. The process 900 may be configured as a part of anomaly flagging prediction model 240 including computer programs (e.g., software) executed on one or more computers or servers including server computing device 120, in which the models, processes, and embodiments described below can be implemented.

In some embodiments, the process 900 may be used to generate at least one instance-level confidence score based on the target cohort identified at a leaf node to provide the reliability of the prediction for the flagged anomaly item. It is presumed that the deviation of the value from the mean under the leaf node chosen in the tree structure indicates the significance as an anomaly considering its confidence level. Different confidence scores per run-time prediction may vary within the same cohort associated with the flagged anomalous item.

Figure 9B:
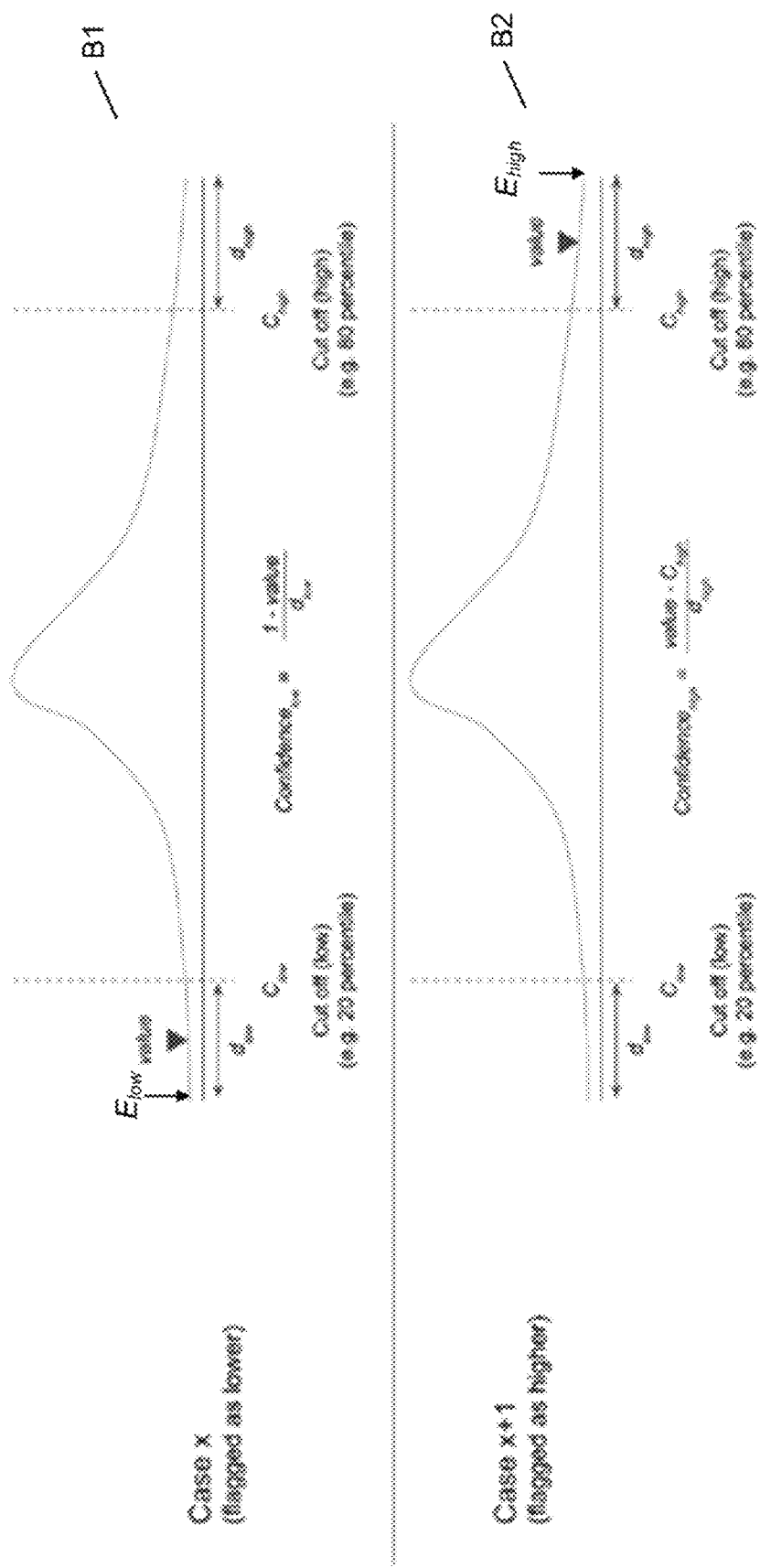
FIG. 9B illustrates diagrams of determining distance-based confidence scores in accordance with some embodiments disclosed herein.

FIG. 9B illustrates diagrams B1 and B2 of determining distance-based confidence scores in accordance with some embodiments disclosed herein. The distance-based confidence scores $Confidence_{high}$ and $Confidence_{low}$ may be represented as equations (3) and (4):

$$Confidence_{high} = \frac{value - C_{high}}{d_{high}} \quad (3)$$

$$Confidence_{low} = \frac{1 - value}{d_{low}} \quad (4)$$

The high cut-off value $C_{high}$ and low cut-off $C_{low}$ value may vary depending on the method used. The high extrema value of the diagrams B1 and B2 represents a statistic value corresponding to a highest probability of the input data feature of the leaf cohort, as illustrated in diagram B1. The low extrema value of the diagrams B1 and B2 represents a statistic value corresponding to a lowest probability of the input data feature of the leaf cohort, as illustrated in diagram B1. The parameter $d_{high}$ in equation (3) represents a distance between a target statistic value and cut-off value $C_{high}$. The parameter $d_{low}$ in equation (4) represents a distance between cut-off value $C_{low}$ and a target statistic value.

In some embodiments, the cut-off values as percentiles may be dynamically determined based on the error rate of each data field for which the model predicts. Both cut-off values $C_{high}$ and $C_{low}$ may be determined with the same or different intervals, (e.g., 20th and 80th percentile, 10th and 90th percentile, or 5th and 85th percentile).

At block 902, the processor 121 obtains the set of statistic values of the input data feature for the data field at the leaf node cohort based on the results of block 802.

At block 904, the processor 121 determines whether the target statistic value for the input data feature at the leaf node cohort (e.g., cohort #1 at node 510L) is larger than a high cut-off value $C_{high}$.

At block 906, upon determining the target statistic value is equal to or larger than the high cut-off value $C_{high}$ for the leaf node cohort, the processor 121 generates an instance-level confidence score as a ratio of a first distance between the target statistic value and the high cut-off value $C_{high}$ to a second distance between a high extrema $E_{high}$ and the high cut-off value $C_{high}$ of the distribution probability according to equation (3).

At block 908, upon determining the target statistic value is less than the high cut-off value $C_{high}$ for the leaf node cohort, the processor 121 determines whether the target statistic value for the data field is lower than a low cut-off value $C_{low}$.

At block 910, upon determining the target statistic value for the leaf node cohort is lower than the low cut-off value $C_{low}$ as illustrated in diagram B2, the processor 121 generates the instance-level confidence score as a ratio of a third distance between 1 and the target statistic value to a fourth distance $d_{low}$ between the low cut-off value $C_{low}$ and a low extrema $E_{low}$ of the distribution probability according to equation (4).

In some embodiments, the processor 121 dynamically adjusts the pair of the high cut-off value $C_{high}$ and the low cut-off value $C_{low}$ for a leaf node cohort by changing various metrics to maximize a model accuracy. High cut-off values and lower cut-off values or thresholds need to be found to maximize the accuracy of the model. High cut-off values and lower cut-off values or thresholds are not required to be equally spaced from the high extrema and the low extrema. Each threshold can be searched individually. For example, the high and low cut-off values or thresholds may be set to 85th and 8th percentiles, respectively. The processor 121 may update the pair of the high cut-off value $C_{high}$ and the low cut-off value $C_{low}$ when retraining the anomaly detection model. A semi-supervised method may be applied to find the optimal cut-off values or thresholds. Various metrics can be used to select the two cut-offs values. For example, the system may use various parameters such as precision, recall, ROC-AUC, and weighted f score selectively.

Figure 9C:
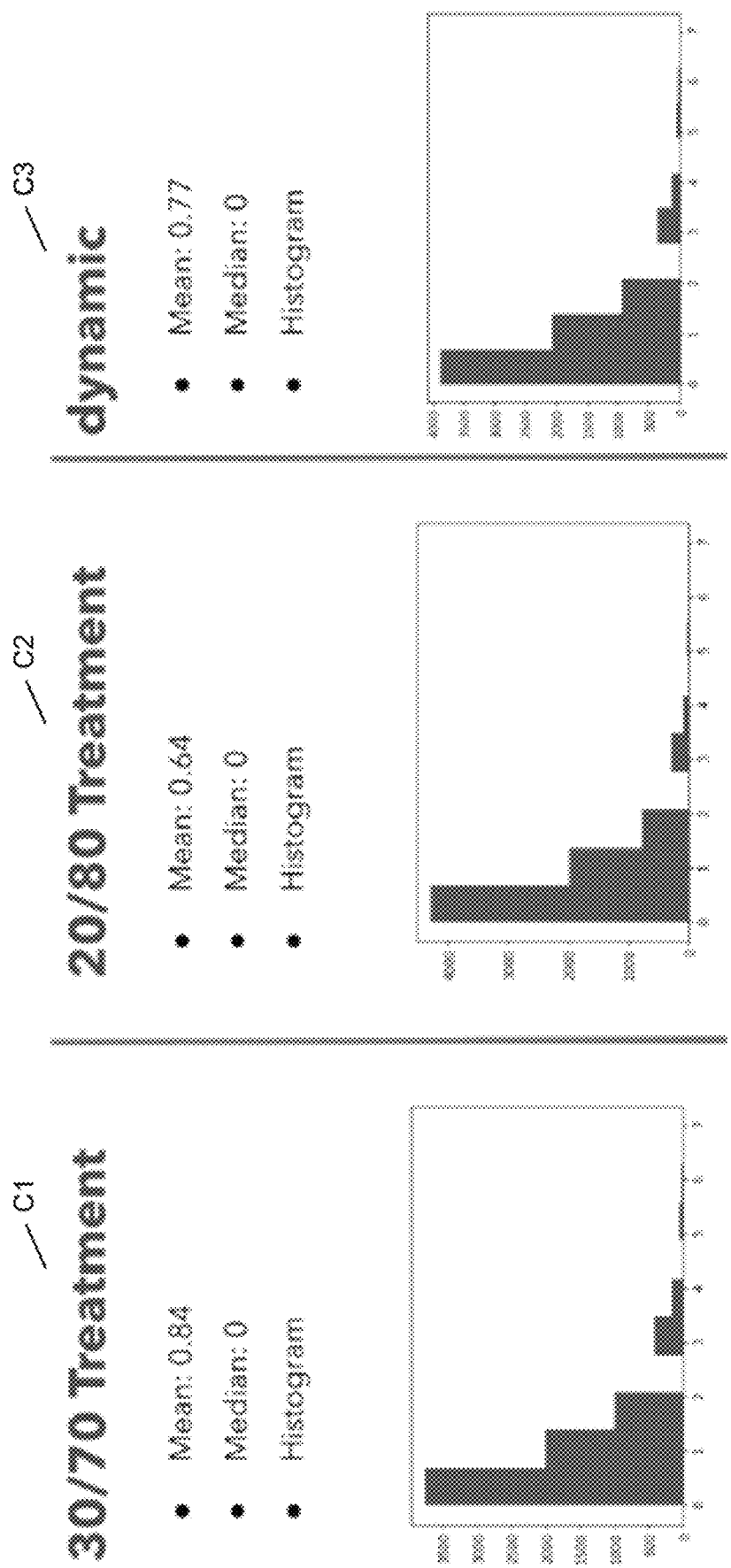
FIG. 9C illustrates example diagrams of evaluating impacts of different thresholds used for flagging anomalies in accordance with some embodiments disclosed herein.

FIG. 9C illustrates example diagrams C1, C2 and C3 used for evaluating impacts of different pairs of thresholds used for flagging anomalies in accordance with some embodiments disclosed herein.

The processor 121 evaluates the impacts of different pairs of thresholds to determine the best pair of performing thresholds for flagging anomalies using the ground truths (e.g., form returns with/without errors). The processor 121 estimates the number of flagged items returned by the anomaly detection models based on different cut-off values. As illustrated in FIG. 9C, diagram C1 shows the evaluating result with a pair of high and low cut-off values of the 30th percentile and 70th percentile. Diagram C2 shows the evaluating result using a pair of the high and low cut-off values of the 20th percentile and 80th percentile. Diagram C3 shows the evaluating result based on dynamic thresholding. The pair of the higher and lower cut-off values corresponding to the 30th percentile and 70th percentile may be selected for the corresponding anomaly detection model. Each anomaly detection model may have its own best preforming thresholds or cut-off values. The pair of cut-off values or thresholds for each anomaly detection model may be computed and stored within the anomaly detection model during training. The computed best preforming thresholds may be used for flagging anomalies in the runtime prediction for respective anomaly detection models.

In some embodiments, an explainer model 260 executed to provide additional information as an explanation of outcomes for the flagged anomalous items. The explainer model 260 is part of the real-time anomaly detection system 124 and is operated to return the top n anomalous items with confidence scores corresponding to the flagged data fields or items.

Figure 10A:
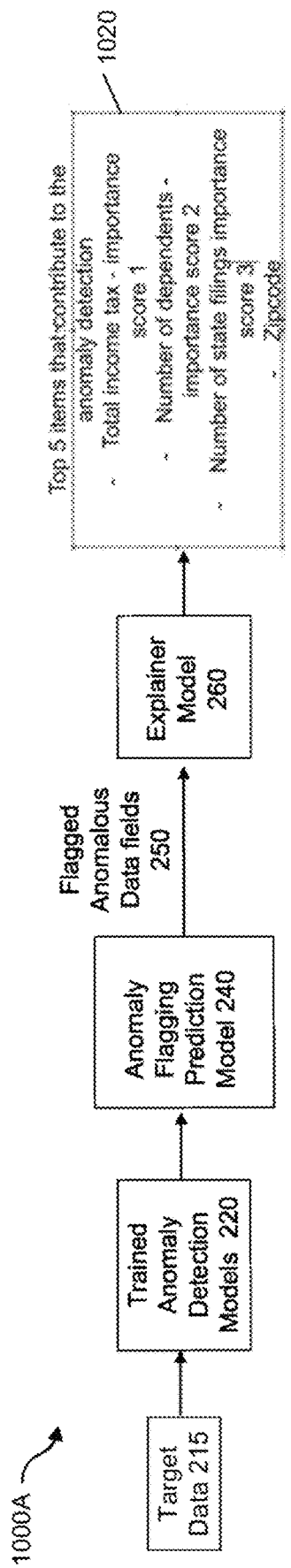
FIG. 10A illustrates an example system that may be used to integrate trained anomaly detection models and an explainer model as a practical application in accordance with some embodiments of the present disclosure.

FIG. 10A illustrates an example system 1000A to integrate trained anomaly detection models 220, an anomaly flagging prediction model 240 and an explainer model 260 into an online or standalone product as a practical application in accordance with some embodiments of the present disclosure. Embodiments described herein may be utilized in evaluating filled digital forms based on the system 100 described in FIGS. 1-2 and disclosure methods. The plurality of trained anomaly detection models 220 may be validated and deployed into a practical software application, or hosted on a server computing device 120 or a website that a user computing device 130 may access through the network 110.

Figure 10B:
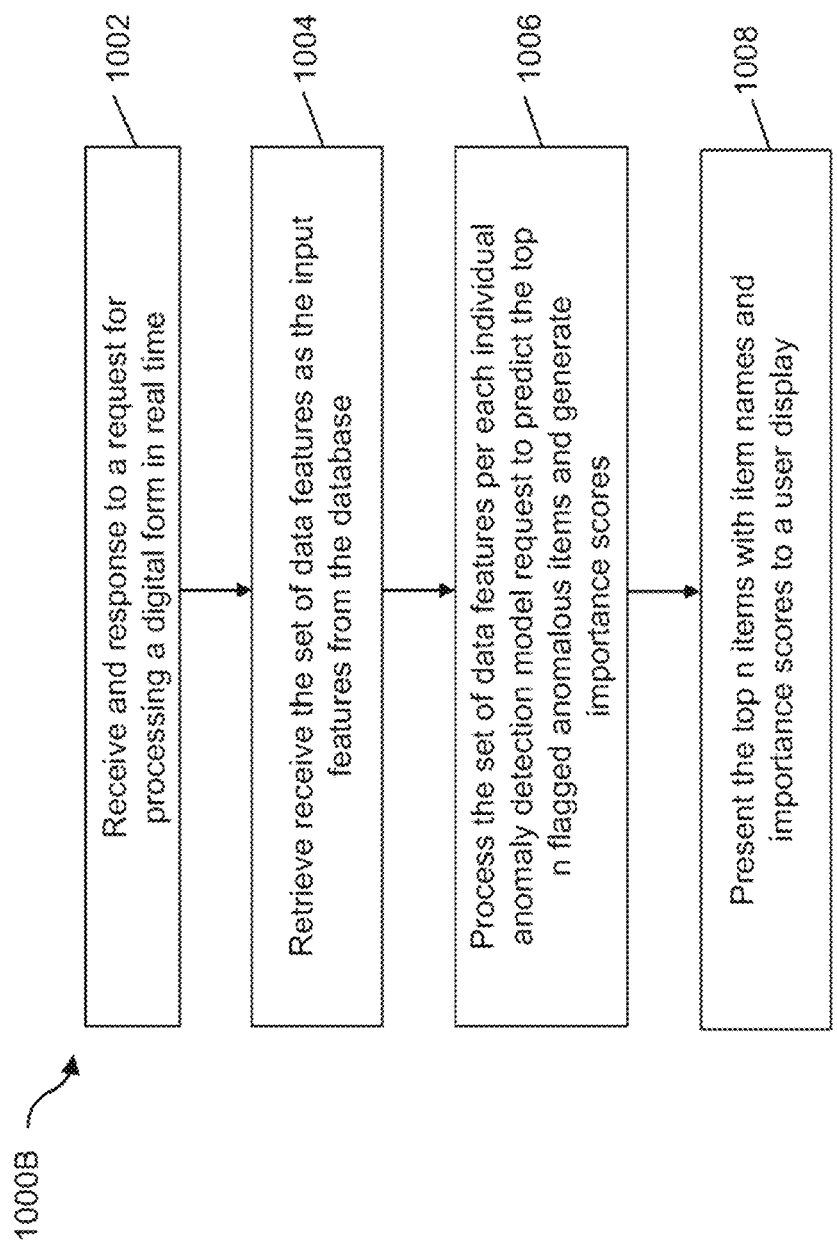
FIG. 10B shows a flowchart illustrating an example process for generating an explanation of an outcome for the flagged anomalous items in a practical application according to some embodiment of the present disclosure.

FIG. 10B shows a flowchart illustrating an example process 1000B for utilizing a trained anomaly detection models 220, an anomaly flagging prediction model 240 and the explainer model 260 to generate an explanation for outcomes of the flagged anomalous items 250 in a practical application according to one embodiment of the present disclosure. The anomaly detection models 220 may be trained on digital form review data, such as tax return review data collected from an online form filing service with the corrected line items identified by the standard evaluation. The anomaly flagging prediction model 240 may be executed to flag anomalous items or data fields and determine confidence scores of the flagged anomalous items 250. The explainer model 260 may be executed to explain each anomaly detection model output. For example, the explainer model 260 may be a Shapely explainer.

At block 1002, the processor 121 receives a request for processing a digital form in real time. The input features are data features presented in a filed digital form and stored in the database 125.

At block 1004, the processor 121 receives the set of data features as the inputs features from the database 125.

At block 1006, the processor 121 processes the set of data features per each individual anomaly detection model request to predict the top n (e.g., top 5) flagged anomalous items with data features or item names and generates confidence scores or importance scores according to the processes 700, 800 and 900.

At block 1008, the processor 121 presents the top n (e.g., top 5) items 1020 with data feature or item names with respective importance scores (e.g., confidence scores or significance value) to a display of a user computing device 130 as illustrated in FIG. 10A. Importance score or significance value of an input data feature or line item for a data field may represent the degree of impact of one data feature on the final prediction. Each importance score corresponds to an individual input data feature. The processor 121 may compute ten importance scores for respective ten input data features. The rank of the importance scores for the top five items are measured by comparing the difference of respective prediction metrics. In some embodiment, the importance score may be a normalized Shapely value through the sigmoid function.

FIG. 10C shows five predicted anomalous data fields or line items with significance values in accordance with some embodiments of the present disclosure.

One or more embodiments may provide cohort-level similarity as a part of the explanation of the anomaly detection model. A similarity score may be determined by the explainer model 260 and is a composite value based on the metrics, such as a number of sharing parent nodes in the tree structure and similarity between the two distributions of the parent nodes. In some embodiments, the processor 121 may determine and return a normalized similarity score for each data feature indicative of respective flagged anomalous data fields or line items. The normalized similarity scores are computed based on n−1 cohorts of a total number (n) of related cohorts. For example, if the prediction is derived by cohort #2, two similarity scores may be computed from cohort #1 and cohort #3. The most similar cohorts may be the top-ranked cohorts representing the explanation of the flagged anomalous data fields or line items since each cohort shares and corresponds to one or more same data features. If the statistical similarity between cohort #1 and cohort #2 is compared, they share two parent cohorts such as cohort #3 and top cohort. If the statistical similarity between cohort #1 and cohort #3 are compared, they only share the top cohort on the "age" data feature. The statistical similarity scores between two probability distributions of different cohorts may be determined by using Kullback-Leibler divergence (KL divergence) or other distribution-distance metrics. The anomaly detection system may include an explanation model to produce an anomaly detection report or output including a number of top items, each anomaly including: 1) a name of detected data filed, 2) a binary flag that indicates whether a data field has an anomalous line item, 3) a corresponding confidence score of the given data field, 4) a statistics value of the data field.

Embodiments of the present disclosure provide a practical technological solution of effectively and accurately processing and delivering form filing evaluation services by predicting and flagging anomalies. The embodiments described herein provide explanations of flagged anomalous items to satisfy user expectations and improve user experience when the users interact with online form filing services while improving accuracy, efficiency, and productivity of online form filing evaluation processes.

Embodiments of the present disclosure provide a new approach and improvements in the technical fields of automatic digital form processing and evaluation by predicting and flagging anomalous line items using statistical tree structures, each trained for a particular data field with multiple cohorts. The disclosed methods improve prediction accuracy by generating confidence scores to flag anomalies through a pair of thresholds that are dynamically set to each of the line item models. For example, the embodiments described herein provide computational efficiency and predictive accuracy with related machine learning tasks. The confidence scores may be normalized and optimized for each anomaly detection model to minimize prediction error and increase prediction accuracy for each anomaly detection model. In some embodiments, the best performing threshold may be obtained by dynamically adjusting thresholds to maximize the model accuracy and for future updating when retraining the models.

Embodiments of the present disclosure provide several improvements and advantages for tax preparation and other services, including: 1) predicting anomalous data feature or line items and high risk returns during standard tax return evaluation processes before filing; 2) reducing prediction errors and increasing prediction accuracy; 3) reducing customer service time (CST) for tax return evaluation; 4) increasing productivity and accuracy of tax return processes; 5) increasing throughput of the filing form standards evaluation; 6) decreasing full service (FS) operational costs for filing form evaluation processes; and 7) enhancing and improving our customers' satisfaction.

Figure 11:
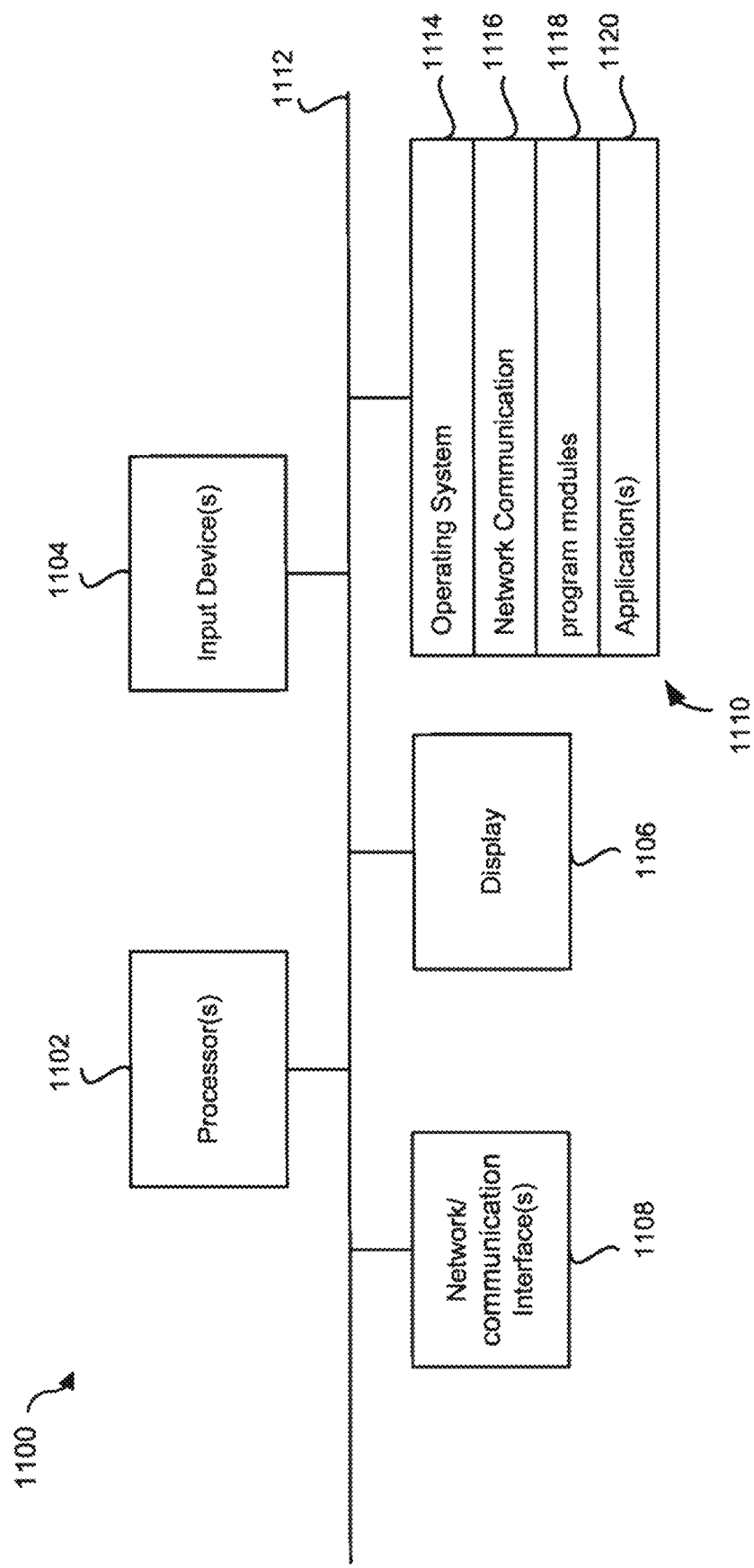
FIG. 11 is a block diagram of an example computing device according to some embodiments of the present disclosure.

FIG. 11 is a block diagram of an example computing device 1100 that may be utilized to execute embodiments to implement processes including various features and functional operations as described herein. For example, computing device 1100 may function as server computing device 120, and user computing device 130 or a portion or combination thereof. In some implementations, the computing device 1100 may include one or more processors 1102, one or more input devices 1104, one or more display devices or output devices 1106, one or more communication interfaces 1108, and memory 1110. Each of these components may be coupled by bus 1112, or in the case of distributed computer systems, one or more of these components may be located remotely and accessed via a network. The computing device 1100 may be implemented on any digital device to execute software applications derived from program instructions stored in the memory 1110, and includes but not limited to personal computers, servers, smartphones, media players, digital tablets, game consoles, email devices, etc.

Processor(s) 1102 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-transitory memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

Input devices 1104 may be any known input devices technology, including but not limited to a keyboard (including a virtual keyboard), mouse, track ball, and touch-sensitive pad or display. To provide for interaction with a user, the features and functional operations described in the disclosed embodiments may be implemented on a computer having a display device 1106 such as a CRT (cathode ray tube) or LCD (liquid crystal display) monitor for displaying information to the user and a keyboard and a pointing device such as a mouse or a trackball by which the user can provide input to the computer. Display device 1106 may be any known display technology, including but not limited to display devices using Liquid Crystal Display (LCD) or Light Emitting Diode (LED) technology.

Communication interfaces 1108 may be configured to enable computing device 1100 to communicate with other another computing or network device across a network, such as via a wired connection, a wireless connection, or a combination of wired and wireless connections. For example, communication interfaces 1108 may include an Ethernet interface, an optical interface, a coaxial interface, an infrared interface, a radio frequency (RF) interface, a universal serial bus (USB) interface, a Wi-Fi interface, a cellular network interface, or the like.

Memory 1110 may be any computer-readable medium that participates in providing computer program instructions and data to processor(s) 1102 for execution, including without limitation, non-transitory computer-readable storage media (e.g., optical disks, magnetic disks, flash drives, etc.), or volatile media (e.g., SCRAM, ROM, etc.). Memory 1110 may include various instructions for implementing an operating system 814 (e.g., Mac OS®, Windows®, Linux). The operating system may be multi-user, multiprocessing, multitasking, multithreading, real-time, and the like. The operating system may perform basic tasks, including but not limited to: recognizing inputs from input devices 1104; sending output to display device 1106; keeping track of files and directories on memory 1110; controlling peripheral devices (e.g., disk drives, printers, etc.) which can be controlled directly or through an I/O controller; and managing traffic on bus 1112. Bus 1112 may be any known internal or external bus technology, including but not limited to ISA, EISA, PCI, PCI Express, USB, Serial ATA or FireWire.

Network communications instructions 1116 may establish and maintain network connections (e.g., software applications for implementing communication protocols, such as TCP/IP, HTTP, Ethernet, telephony, etc.). Application(s) 1120 and program modules 1118 may include software application(s) and different functional program modules which are executed by processor(s) 1102 to implement the processes described herein and/or other processes. For example, the program modules 1118 may include anomaly detection model system 124. The program modules 1118 may include but are not limited to software programs, machine learning models, objects, components, data structures that are configured to perform tasks or implement the processes described herein. The processes described herein may also be implemented in operating system 1114.

The features and functional operations described in the disclosed embodiments may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

The described features and functional operations described in the disclosed embodiments may be implemented in a computer system that includes a back-end component, such as a data server, or that includes a middleware component, such as a server computing device or an Internet server, or that includes a front-end component, such as a user device having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user computing devices and server computing devices. A user computing device and server may generally be remote from each other and may typically interact through a network. The relationship of user computing devices and server computing device may arise by virtue of computer programs running on the respective computers and having a client-server relationship to each other.

Communication between various network and computing devices 1100 of a computing system may be facilitated by one or more application programming interfaces (APIs). APIs of system may be proprietary and/or may be examples available to those of ordinary skill in the art such as Amazon® Web Services (AWS) APIs or the like. The API may be implemented as one or more calls in program code that send or receive one or more parameters through a parameter list or other structure based on a call convention defined in an API specification document. One or more features and functional operations described in the disclosed embodiments may be implemented using an API. An API may define one or more parameters that are passed between an application and other software instructions/code (e.g., an operating system, library routine, function) that provides a service, that provides data, or that performs an operation or a computation. A parameter may be a constant, a key, a data structure, an object, an object class, a variable, a data type, a pointer, an array, a list, or another call.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by a server computing device comprising a processor and a memory, the server computing device being configured to execute an anomaly detection learning system for predicting and flagging anomalies in a digital form, the anomaly detection learning system comprising a plurality of anomaly detection models stored as computer-executable instructions in the memory, the method comprising executing the instructions by the processor to cause the server computing device to perform processing comprising:

receiving, from a database in communication with the processor, a target dataset associated with the digital form, the target dataset comprising a target value of an input data feature for a data field in the digital form and values of a set of cohorting data features;

obtaining a first anomaly detection model from the plurality of anomaly detection models, the first anomaly detection model comprising a statistical tree structure associated with the input data feature, the statistical tree structure comprising a plurality of nodes corresponding to a set of cohorts, each cohort comprising a set of statistic values of the input data feature associated with a set of system users, a variance of values of the input data feature and respective cohorting data features, the nodes corresponding to the set of cohorts being connected via branches from a higher-level cohort to one or more lower level cohorts, each branch being established based on reduced variance values and a condition threshold of the cohorting data feature of the higher-level cohort;

traversing the statistical tree structure with the target dataset from a first node to a leaf node to form a set of target cohorts and determine a target statistic value of the input data feature at the leaf node;

determining that the target statistic value is not within a pair of thresholds; and flagging the data field of the target dataset as an anomalous field.

2. The method of claim 1, wherein the processing further comprises generating one or more confidence scores for a runtime prediction based on one or more variance of values of the input data feature for the data field from a top cohort at the first node to a lower cohort at the leaf node.

3. The method of claim 2, wherein generating the one or more confidence scores further comprises:

traversing the statistical tree structure with the target dataset to determine the set of the target cohorts from the first node to a target leaf node by matching the values of the set of cohorting data features of the target dataset to satisfy the respective condition threshold of the cohorting data feature corresponding to the branch;

generating, based on variance of values of the input data feature of each of the set of the target cohorts, the one or more confidence scores as a ratio of a variance of values for the input data feature of a higher-level cohort to a variance of values for the input data feature of an adjacent lower level cohort;

applying a sigmoid normalization function to normalize the one or more variance-based confidence scores; and predicting the flagged anomaly field with a high confidence upon determining a greater reduction in variance in view of one or more normalized variance-based confidence scores on the leaf node target cohort compared to one or more corresponding higher-level cohorts.

4. The method of claim 3, wherein generating the one or more confidence scores further comprises:

obtaining the set of statistic values of the input data feature for the leaf node target cohort;

determining whether the target statistic value for the input data feature is larger than a high cut-off value or lower than a low cut-off value;

generating an instance-level confidence score as a ratio of a first distance between the target statistic value and the high cut-off value to a second distance between the high cut-off value and a high extrema upon determining that the target statistic value is larger than the high cut-off value; and generating the instance-level confidence score as a ratio of a third distance between one and the target statistic value to a fourth distance between the low cut-off value and a low extrema upon determining that the target statistic value is lower than the high cut-off value.

5. The method of claim 4, wherein generating a confidence score further comprises:

dynamically adjusting the high cut-off value and the low cut-off value for the leaf node target cohort to maximize model accuracy; and updating the high cut-off value and the low cut-off value when retraining the first anomaly detection model.

6. The method of claim 2, wherein the processing further comprises flagging the data field for the target dataset with the confidence score and a binary dataset indicating that the data field has an anomalous item.

7. The method of claim 1, wherein each condition threshold is a binary function to branch the higher-level cohort into two lower level cohorts.

8. The method of claim 1, wherein the processing further comprises training the plurality of anomaly detection models with respective statistical tree structures for a set of data fields.

9. The method of claim 8, wherein the statistical tree structure comprises:

the first node, multiple intermediate nodes and multiple leaf nodes, each node being associated with the cohorting data features of each cohort and a training data feature for the data field, each node corresponding to a statistic of values of the training data features of the respective cohort; and a plurality of branching between the first node and one or more intermediate nodes and between the one or more intermediate nodes and the leaf nodes, wherein a higher-level node is branched to two lower level nodes based on a threshold condition established using one of the cohorting data features of the cohort of the higher-level node, the condition threshold being selected to reduce a variance of the values of the data field of the respective cohort.

10. The method of claim 9, wherein the training data feature is different from the cohorting data features.

11. A computing system, comprising:

a server computing device comprising a processor and a memory;

a database in communication with the processor and configured to store a plurality of data features and a digital form with a plurality of data fields, and a machine learning system comprising a plurality of anomaly detection models, the machine learning system including computer-executable instructions stored in a memory and executed by the processor to cause the server computing device to perform processing comprising:

receiving, from a database in communication with the processor, a target dataset associated with the digital form, the target dataset comprising a target value of an input data feature for a data field in the digital form and values of a set of cohorting data features;

obtaining a first anomaly detection model from the plurality of anomaly detection models, the first anomaly detection model comprising a statistical tree structure associated with the input data feature, the statistical tree structure comprising a plurality of nodes corresponding to a set of cohorts, each cohort comprising a set of statistic values of the input data feature associated with a set of system users, a variance of values of the input data feature and respective cohorting data features, the nodes corresponding to the set of cohorts being connected via branches from a higher-level cohort to one or more lower level cohorts, each branch being established based on reduced variance values and a condition threshold of the cohorting data feature of the higher-level cohort;

traversing the statistical tree structure with the target dataset from a first node to a leaf node to form a set of target cohorts and determine a target statistic value of the input data feature at the leaf node;

determining that the target statistic value is not within a pair of thresholds; and flagging the data field of the target dataset as an anomalous field.

12. The computing system of claim 11, wherein the processing further comprises generating one or more confidence scores for a runtime prediction based on one or more variance of values of the input data feature for the data field from a top cohort at the first node to a lower cohort at the leaf node.

13. The computing system of claim 12, wherein generating the one or more confidence scores further comprises:
traversing the statistical tree structure with the target dataset to determine the set of the target cohorts from the first node to a target leaf node by matching the values of the set of cohorting data features of the target dataset to satisfy the respective condition threshold of the respective cohorting data feature corresponding to the respective branch;
generating, based on variance of values of the input data feature of each of the set of the target cohorts, the one or more confidence scores as a ratio of a variance of values for the input data feature of a higher-level cohort to a variance of values for the input data feature of an adjacent lower level cohort;
applying a sigmoid normalization function to normalize the one or more variance-based confidence scores; and
predicting the flagged anomaly field with a high confidence upon determining a greater reduction in variance in view of one or more normalized variance-based confidence scores on the leaf node target cohort compared to one or more corresponding higher-level cohorts.

14. The computing system of claim 13, wherein generating the one or more confidence scores further comprises:
obtaining the set of statistic values of the input data feature for the leaf node target cohort;
determining whether the target statistic value for the input data feature is larger than a high cut-off value or lower than a low cut-off value;
generating an instance-level confidence score as a ratio of a first distance between the target statistic value and the high cut-off value to a second distance between the high cut-off value and a high extrema upon determining that the target statistic value is larger than the high cut-off value; and
generating the instance-level confidence score as a ratio of a third distance between one and the target statistic value to a fourth distance between the low cut-off value and a low extrema upon determining that the target statistic value is lower than the high cut-off value.

15. The computing system of claim 14, wherein generating a confidence score further comprises:
dynamically adjusting the high cut-off value and the low cut-off value for the leaf node target cohort to maximize model accuracy; and
updating the high cut-off value and the low cut-off value when retraining the first anomaly detection model.

16. The computing system of claim 12, wherein the processing further comprises flagging the data field for the target dataset with the confidence score and a binary dataset indicating that the data field has an anomalous item.

17. The computing system of claim 11, wherein each condition threshold is a binary function to branch the higher-level cohort into two lower level cohorts.

18. The computing system of claim 11, wherein the processing further comprises training the plurality of anomaly detection models with respective statistical tree structures for a set of data fields.

19. The computing system of claim 18, wherein the statistical tree structure comprises:
the first node, multiple intermediate nodes and multiple leaf nodes, each node being associated with the cohorting data features of each cohort and a training data feature for the data field, each node corresponding to a statistic of values of the training data features of the respective cohort; and
a plurality of branching between the first node and one or more intermediate nodes and between the one or more intermediate nodes and the leaf nodes, wherein a higher-level node is branched to two lower level nodes based on a threshold condition established using one of the cohorting data features of the cohort of the higher-level node, the condition threshold being selected to reduce a variance of the values of the data field of the respective cohort.

20. The computing system of claim 19, wherein the training data feature is different from the cohorting data features.

* * * * *